(12) United States Patent
Kile

(10) Patent No.: US 8,602,856 B2
(45) Date of Patent: Dec. 10, 2013

(54) THRESHING BARS AND COMBINE HARVESTER THRESHER FORMED THEREWITH

(71) Applicant: Ronald J. Kile, Rosalia, WA (US)

(72) Inventor: Ronald J. Kile, Rosalia, WA (US)

(*) Notice: Subject to any disclaimer, the term of this patent is extended or adjusted under 35 U.S.C. 154(b) by 0 days.

(21) Appl. No.: 13/902,041

(22) Filed: May 24, 2013

(65) Prior Publication Data

US 2013/0260845 A1    Oct. 3, 2013

Related U.S. Application Data

(63) Continuation of application No. 13/332,863, filed on Dec. 21, 2011, now Pat. No. 8,475,247, which is a continuation of application No. 13/179,490, filed on Jul. 9, 2011, now Pat. No. 8,087,982.

(51) Int. Cl.
    *A01F 12/34*   (2006.01)

(52) U.S. Cl.
    USPC .......................................................... 460/71

(58) Field of Classification Search
    USPC ........................................ 460/71, 66, 72, 110
    See application file for complete search history.

(56) References Cited

U.S. PATENT DOCUMENTS

| | | |
|---|---|---|
| 3,203,428 A | 8/1965 | Ausherman |
| 3,512,533 A | 5/1970 | Loewen |
| 3,927,679 A | 12/1975 | Ausherman |
| 4,505,279 A | 3/1985 | Campbell et al. |
| 4,889,517 A | 12/1989 | Strong et al. |
| 4,936,810 A | 6/1990 | Strong et al. |
| 4,946,419 A | 8/1990 | Cromheecke et al. |
| 4,964,838 A | 10/1990 | Cromheecke et al. |
| 5,035,675 A | 7/1991 | Dunn et al. |
| 5,192,245 A | 3/1993 | Francis et al. |
| 5,919,086 A | 7/1999 | Derry |
| 6,261,176 B1 | 7/2001 | Welch |
| 6,264,553 B1 | 7/2001 | Neumann et al. |
| 6,325,714 B1 | 12/2001 | Tanis et al. |
| 6,375,564 B1 | 4/2002 | Amann et al. |

(Continued)

FOREIGN PATENT DOCUMENTS

| | | | | |
|---|---|---|---|---|
| JP | 2009060834 A | * | 3/2009 | ............ A01F 12/22 |
| RO | 115010 B1 | * | 10/1999 | ............ A01D 41/12 |
| SU | 1029888 A | * | 7/1983 | ............ A01F 12/20 |

OTHER PUBLICATIONS

AllPartsStore.com, Rasp Bar, Part A—86503256, Fig 1-4, No Date.*

*Primary Examiner* — Árpád Fábián-Kovács
(74) *Attorney, Agent, or Firm* — Parsons & Goltry; Michael W. Goltry; Robert A. Parsons

(57) ABSTRACT

A combine harvester threshing drum threshing bar includes a rigid, integral, unitary threshing fixture having a leading edge and an opposed trailing end, an upstream face and an opposed downstream face formed with an oblique crop deflecting surface, a threshing side and an opposed threshing drum emplacement side. The threshing side includes a trailing threshing face formed toward the trailing end of the threshing fixture, and an inclined leading threshing face extending from the trailing threshing face to the leading edge, and which cooperates with the threshing drum emplacement side and the upstream and downstream faces of the threshing fixture at the leading edge to form a wedge in the threshing fixture. Crop threshing grooves are formed in the trailing threshing face of the top threshing side of the threshing fixture, which extend from the trailing end to the leading threshing face of the threshing fixture.

5 Claims, 25 Drawing Sheets

(56) References Cited

U.S. PATENT DOCUMENTS

| | | |
|---|---|---|
| 7,059,960 B2 | 6/2006 | Mackin et al. |
| 7,070,498 B2 | 7/2006 | Grywacheski et al. |
| 7,201,652 B2 | 4/2007 | Van De Sluis et al. |
| 7,390,252 B1 | 6/2008 | Tanis et al. |
| 7,632,180 B2 | 12/2009 | Farley et al. |
| 7,632,182 B2 | 12/2009 | Farley et al. |
| 7,749,054 B2 | 7/2010 | Farley et al. |
| 2007/0026913 A1 | 2/2007 | Kuchar |
| 2008/0167100 A1 | 7/2008 | Farley et al. |
| 2008/0167101 A1 | 7/2008 | Farley et al. |
| 2011/0143826 A1* | 6/2011 | Farley .......................... 460/68 |

\* cited by examiner

THRESHING BARS AND COMBINE HARVESTER THRESHER FORMED THEREWITH

FIELD OF THE INVENTION

The present invention relates to combine harvesters.

More particularly, the present invention relates to threshing drums of combine harvesters.

In a further and more specific aspect, the present invention relates to threshing implements of threshing drums of combine harvesters.

BACKGROUND OF THE INVENTION

Agriculture is a major industry in the U.S., which is a net exporter of food. As of 2009 there were approximately 2.2 million farms in the U.S. covering an area of approximately 920 million acres. Although in 1800 approximately ninety percent of the entire U.S. population was employed in agriculture, present day numbers have dropped to approximately two percent due largely to the development and implementation of large, automated agricultural equipment, such as combine harvesters, which have replaced large numbers of farm workers.

The crops grown in the U.S., such as wheat, barley, and rye, are only partly edible. While the seeds or grains at the top of each plant are edible and useful for making products such as bread and cereal, the rest of the plant, which is known as the chaff, is inedible and has to be discarded. Before modern-day machines were developed, such as in the 1800's, agricultural workers had to harvest crops by carrying out a series of laborious operations one after another. First they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

In operation, a combine harvester is driven through a field of a growing crop, whereby the combine harvester cuts, threshes, and separates the grain from the chaff using rotating blades, wheels, sieves, and elevators. The grain collects in a tank inside the combine harvester, which is periodically emptied into tractors that drive alongside, while the chaff is ejected onto the field from an ejection spout at the back of the combine harvester.

In general, a combine harvester includes a header, a pickup reel, a cutter, a threshing drum, sieves, a collection tank, and conveyors, such as rotating belts and spinning augers. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings separating the grains from the chaff to form threshings, namely, the chaff and the separated grains. A conveyance conveys the threshings along the thresher from an upstream location of thresher to a downstream location of thresher as the thresher rotates and the grains fall through sieves into a collection tank inside the combine harvester, which is periodically emptied, such as into tractors that drive alongside, while a conveyor takes up and conveys the chaff to the ejection spout for ejection onto the field. Some combine harvesters have a rotating spreader mechanism that throws the chaff over a wide area, while others have bailers that bail the chaff for later use, such as for animal bedding.

Existing combine harvester threshers are complicated and difficult and expensive to maintain. Because some crops require aggressive threshing and others require less aggressive threshing, a thresher must be carefully chosen and installed to meet the given threshing performance required for the particular crop to be threshed. For farmers that grow various crops, this often requires the farm to maintain numerous combine harvesters at a substantial cost with threshers configured for different crops, or to periodically replace threshers for meeting the specified threshing needs of the given crops to be threshed. Given these and other deficiencies in the art, there is a need in the art for a threshing drum that may be easily and efficiently maintained and serviced, and that may be easily and efficiently configured to meet different crop-specific threshing requirements. There is also a need in the art for improved threshing implements useful with threshing drums that may be configured and arranged to meet specific threshing requirements.

SUMMARY OF THE INVENTION

According to the principle of the invention, a combine harvester threshing drum threshing bar consists of a rigid, integral, unitary threshing fixture having a leading edge and an opposed trailing end, an upstream face and an opposed downstream face, a top threshing side and an opposed bottom threshing drum emplacement side. The leading edge has a first width extending from the upstream face to the downstream face, and the trailing end has a second width extending from the upstream face to the downstream face. The opposed upstream and downstream faces extend between the top threshing side and the opposed bottom threshing drum emplacement side of the threshing fixture from the leading edge of the threshing fixture to the trailing end of the threshing fixture. The top threshing side includes a trailing threshing face and a leading threshing face that meet at a first corner formed in the top threshing side. The first corner is located between the leading edge and the trailing end of the threshing fixture and extends from the upstream face to the downstream face. The trailing threshing face extends between the opposed upstream and downstream faces of the threshing fixture from the trailing end to the first corner. The leading threshing face extends between the opposed upstream and downstream faces of the threshing fixture from the first corner to the leading edge, and inclines downwardly relative to the trailing threshing face from the first corner and meets, and cooperates with, the bottom threshing drum emplacement side and the opposed upstream and downstream faces of the threshing fixture at the leading edge to form a wedge in the threshing fixture. Crop threshing grooves are formed in the trailing threshing face of the top threshing side of the threshing fixture. The upstream face includes a rearward surface and a forward surface that meet at a second corner formed in the upstream face, the second corner is formed between the leading edge and the trailing end of the threshing fixture and extends from the top threshing side of the threshing fixture to the bottom threshing drum emplacement side of the threshing fixture. The rearward surface of the upstream face is substantially parallel with respect to the downstream face of the threshing fixture, and extends between the top threshing side and the bottom threshing drum emplacement side of the threshing fixture from the trailing end to the second corner. The forward surface of the upstream face extends between the top threshing side and the bottom threshing drum emplacement side of the threshing fixture from the second corner to the leading edge, and is in-turned from the rearward surface and toward the downstream face of the threshing fixture from the second corner to the leading edge of the threshing fixture forming an oblique crop material deflecting surface. The first width of the leading edge of the threshing fixture is less than the second width of the trailing end of the threshing fixture. The crop threshing grooves extend along the threshing fixture in a direction from the trailing end of the threshing fixture to the leading edge of the threshing fixture. The crop threshing grooves are further parallel relative to each other. The crop threshing grooves are still further substantially parallel relative to the oblique crop material deflecting surface of the upstream face of the threshing fixture, and are oblique relative to the leading edge of the threshing fixture. The crop threshing grooves further extend downwardly along the leading threshing face of the top threshing side of the threshing fixture and, in a particular embodiment, terminate along the leading threshing face at an intermediate location relative to the first corner and the leading edge of the threshing fixture. In a further embodiment, the crop threshing grooves are oblique relative to the oblique crop material deflecting surface of the upstream face of the threshing fixture, and the leading edge of the threshing fixture. In still a further embodiment, the crop threshing grooves include first grooves formed proximate to the upstream face of the threshing fixture, and second grooves formed proximate to the downstream face of the threshing fixture. The first grooves include parallel first groove portions that are substantially parallel relative to the oblique crop material deflecting surface and are oblique relative to the leading edge of the threshing fixture, and parallel second groove portions that are oblique relative to the oblique crop material deflecting surface and perpendicular relative to the leading edge. The second grooves include parallel third groove portions that are oblique relative to the oblique crop material deflecting surface and the parallel first grooves, and are oblique relative to the leading edge of the threshing fixture, and parallel fourth groove portions that are oblique relative to the oblique crop material deflecting surface, perpendicular relative to the leading edge, and parallel relative to the parallel second groove portions.

According to the principle of the invention, a combine harvester thresher includes a combine harvester threshing drum mounted for rotation in a threshing direction relative to a combine harvester concave. The threshing drum has a cylindrical exterior. A population of threshing drum threshing bars is affixed to the cylindrical exterior of the threshing drum for threshing a crop applied between the cylindrical exterior of the threshing drum and the concave in response to rotation of the threshing drum in the threshing direction. Each threshing bar is a rigid, integral, unitary threshing fixture that includes a leading edge directed into the threshing direction and an opposed trailing end directed away from the threshing direction, an upstream face and an opposed downstream face, a top threshing side for threshing a crop applied between the cylindrical exterior of the threshing drum and the concave in response to rotation of the threshing drum in the threshing direction, and an opposed bottom threshing drum emplacement side affixed to the cylindrical exterior of the threshing drum. The leading edge has a first width extending from the upstream face to the downstream face, and the trailing end has a second width extending from the upstream face to the downstream face. The opposed upstream and downstream faces extend between the top threshing side and the opposed bottom threshing drum emplacement side of the threshing fixture from the leading edge of the threshing fixture to the trailing end of the threshing fixture. The top threshing side includes a trailing threshing face and a leading threshing face that meet at a first corner formed in the top threshing side. The first corner is located between the leading edge and the trailing end of the threshing fixture and extends from the upstream face to the downstream face. The trailing threshing face extends between the opposed upstream and downstream faces of the threshing fixture from the trailing end to the first corner. The leading threshing face extends between the opposed upstream and downstream faces of the threshing fixture from the first corner to the leading edge, and inclines downwardly relative to the trailing threshing face from the first corner and meets, and cooperates with, the bottom threshing drum emplacement side and the opposed upstream and downstream faces of the threshing fixture at the leading edge to form a wedge in the threshing fixture. Crop threshing grooves are formed in the trailing threshing face of the top threshing side of the threshing fixture. The upstream face includes a rearward surface and a forward surface that meet at a second corner formed in the upstream face, the second corner is formed between the leading edge and the trailing end of the threshing fixture and extends from the top threshing side of the threshing fixture to the bottom threshing drum emplacement side of the threshing fixture. The rearward surface of the upstream face extends between the top threshing side and the bottom threshing drum emplacement side of the threshing fixture from the trailing end to the second corner. The forward surface of the upstream face extends between the top threshing side and the bottom threshing drum emplacement side of the threshing fixture from the second corner to the leading edge, and is in-turned from the rearward surface and toward the downstream face of the threshing fixture from the second corner to the leading edge of the threshing fixture forming an oblique crop material deflecting surface for deflecting a crop applied between the cylindrical exterior of the threshing drum and the concave away from the upstream face in response to rotation of the threshing drum in the threshing direction. The first width of the leading edge of the threshing fixture is less than the second width of the trailing end of the threshing fixture. The crop threshing grooves extend along the threshing fixture in a direction from the trailing end of the threshing fixture to the leading edge of the threshing fixture. The crop threshing grooves are further parallel relative to each other. The crop threshing grooves are still further substantially parallel relative to the oblique crop material deflecting surface of the upstream face of the threshing fixture, and are oblique relative to the leading edge of the threshing fixture. The crop threshing grooves further extend downwardly along the leading threshing face of the top threshing side of the threshing fixture, and terminate along the leading threshing face at an intermediate location relative to the first corner and the leading edge of the threshing fixture. In particular embodiment, the crop threshing grooves are oblique relative to the oblique crop material deflecting surface of the upstream face of the threshing fixture, and the leading edge of the threshing fixture. In yet still a further embodiment, the crop threshing grooves include first grooves formed proximate to the upstream face of the threshing fixture, and second grooves formed proximate to the downstream face of the threshing fixture. The first grooves include parallel first groove portions that are parallel relative to the oblique crop material deflecting surface and are oblique relative to the leading edge of the threshing fixture, and parallel second groove portions that are oblique relative to the oblique crop material deflecting surface and perpendicular relative to the leading edge. The second grooves include parallel third groove portions that are oblique relative to the oblique crop material deflecting surface and the parallel first grooves, and are oblique relative to the leading edge of the threshing fixture, and parallel fourth groove portions that are oblique relative to the oblique crop material deflecting surface, perpendicular relative to the leading edge, and parallel relative to the parallel second groove portions.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
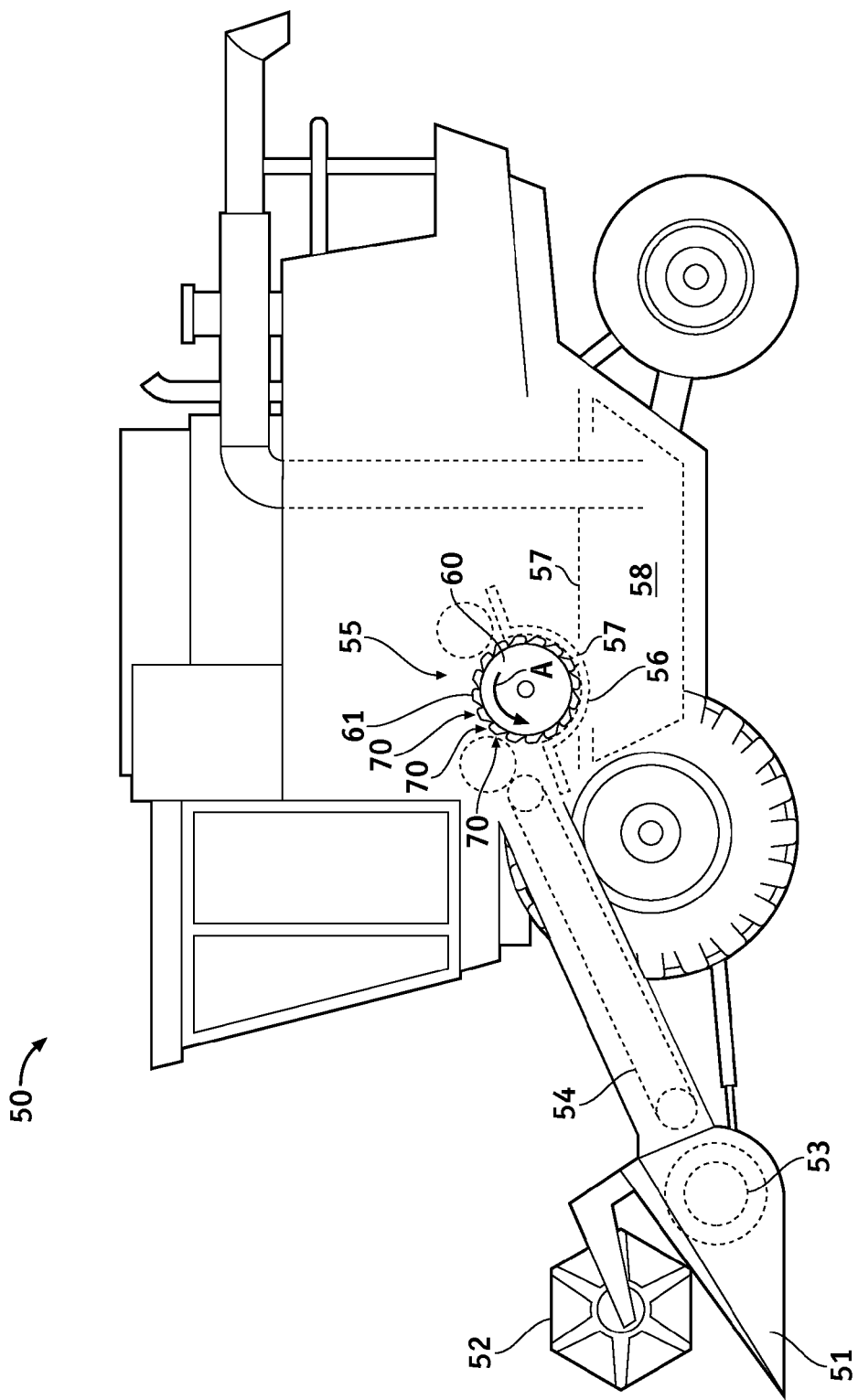
FIG. 1 is a highly generalized schematic representation of a combine harvester incorporating a thresher concave operatively positioned under a thresher consisting of a threshing drum formed with threshing bars constructed and arranged in accordance with the principle of the invention.

Turning now to the drawings, in which like reference characters indicate corresponding elements throughout the several views, attention is first directed to FIG. 1 in which there is seen a highly generalized schematic representation of a combine harvester 50 incorporating a thresher 55 consisting of a threshing drum 60 having a cylindrical exterior 61 configured with threshing bars 70 constructed and arranged in accordance with the principle of the invention. In general, combine harvester includes a header 51, a pickup reel 52, a cutter 53, a conveyer 54 formed between cutter 53 and thresher 55, a combine harvester concave or thresher concave 56 operatively positioned underneath thresher 55, sieves 57, a collection tank 58, and an array of conveyors, such as rotating belts and spinning augers. In the operation of combine harvester 50 as it is driven through a crop header 51 gathers the crop, and pickup reel 52 pushes the crop down toward cutter 53, which cuts the crop at the base near ground level to form crop cuttings or, simply, cuttings. A conveyor 54 picks up the cuttings from cutter 53, and conveys the cuttings to the thresher 55 for threshing. Thresher 55 rotates and threshes the cuttings along thresher concave 56 separating the grains from the chaff to form threshings, namely, the chaff and the separated grains. As thresher 55 rotates and threshes the cuttings to form threshings, a conveyance conveys the threshings along thresher 55 in a direction from an upstream location of thresher 55 to a downstream location of thresher 55, where the grains fall through sieves 57 into collection tank 58 inside combine harvester 50, which is periodically emptied, such as into tractors that drive alongside, while a conveyor takes up and conveys the chaff to an ejection spout for ejection onto the field.

Figure 40:
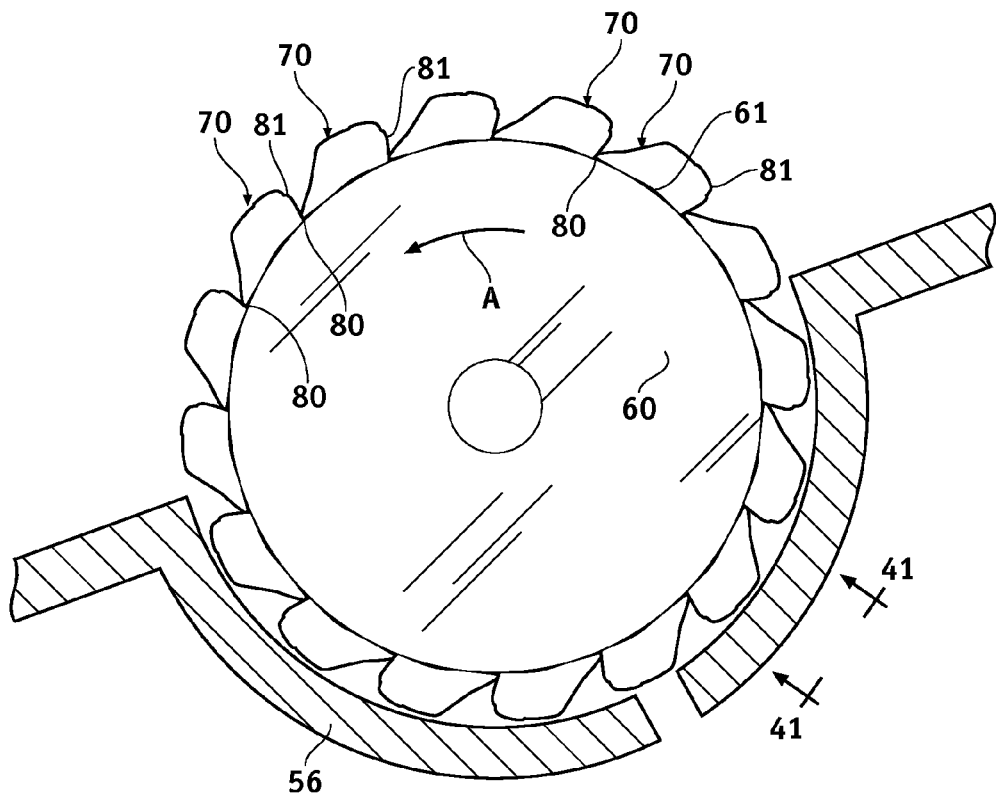
FIG. 40 is an enlarged, highly generalized side elevation view of the thresher concave and thresher of FIG. 1 consisting of the threshing drum formed with threshing bars constructed and arranged in accordance with the principle of the invention.

Thresher 55 consists of a threshing drum 60 that is mounted for rotation relative to thresher concave 56 in a threshing direction, or threshing direction of rotation, generally indicated by arrowed line A. Arrowed line A indicates the direction of rotation of threshing drum 60, which is the direction of travel of threshing bars 70 applied to threshing drum 60. Threshing drum 60 has a cylindrical outer surface or exterior 61, and a population of threshing drum threshing bars 70, constructed and arranged in accordance with the principle of the invention, is affixed to cylindrical exterior 61 of threshing drum 60 for threshing a crop applied between cylindrical exterior 61 of threshing drum 60 and thresher concave 56 in response to rotation of threshing drum 60 in the threshing direction indicated by arrowed line A. In response to rotation of threshing drum 60 in the threshing direction, threshing bars 70 thresh the crop cuttings between cylindrical exterior 61 and thresher concave 56 separating the grains from the chaff to form threshings, namely, the chaff and the separated grains. A conveyance (not shown) of combine harvester 50, such as an auger, conveys the threshings along the rotating thresher 55 in a direction from an upstream location of thresher 55 to a downstream location of thresher 55 where the grains fall through sieves 57 into collection tank 58 inside combine harvester 50, which is periodically emptied, such as into tractors that drive alongside, while a conveyor takes up and conveys the chaff to an ejection spout for ejection onto the field. FIG. 1 is exemplary of a highly generalized left side elevation view of combine harvester 50, and FIG. 40 is exemplary of an enlarged, highly generalized side elevation view of thresher concave 56 and thresher 55 consisting of threshing drum 60 formed with threshing bars 70 constructed and arranged in accordance with the principle of the invention, whereby arrowed line A indicates a counterclockwise rotational direction of threshing drum 60 being the threshing direction of rotation of thresher 55.

With the exception of the threshing bars, including threshing bars 70 and the ensuing embodiments of threshing bars disclosed in detail throughout the remainder of this specification and which are constructed and arranged in accordance with the principle of the invention, combine harvester 50 is exemplary of a typical combine harvester well known in the art, further details of which will readily occur to the skilled artisan and will not be discussed in further detail.

Figure 2:
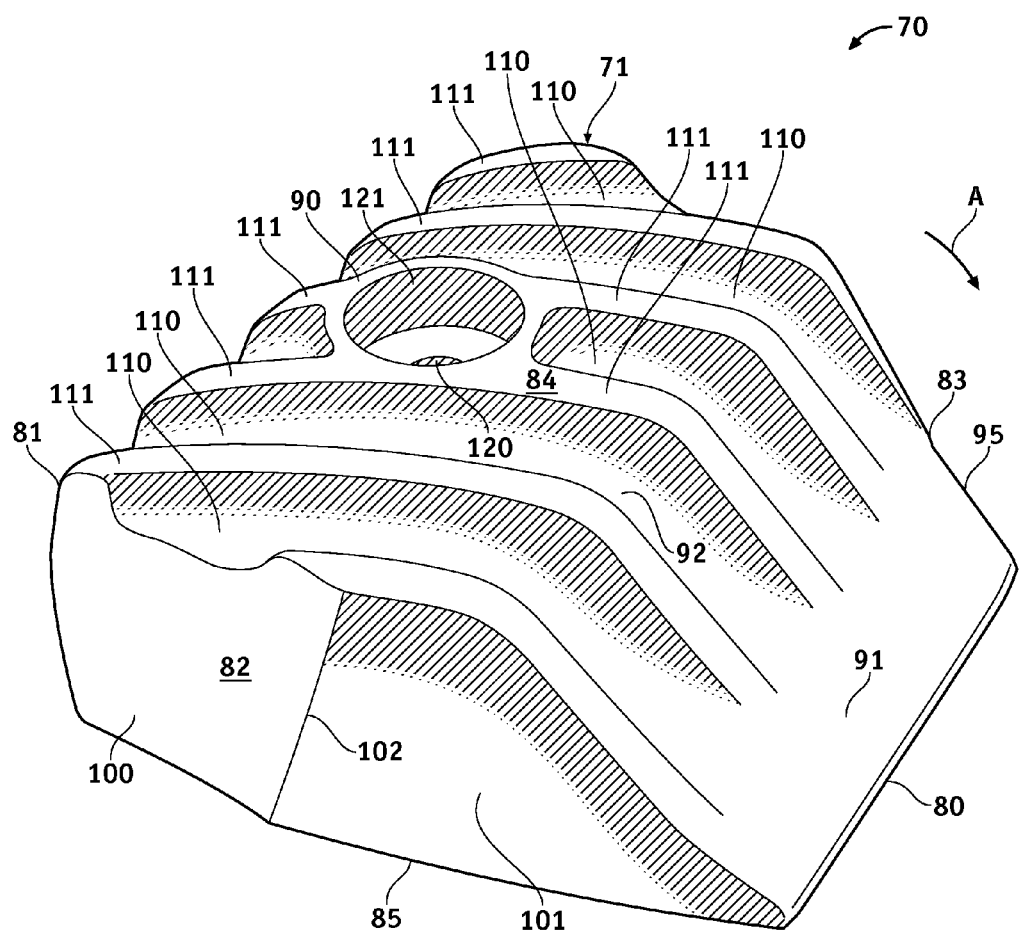
FIG. 2 is a front perspective view of a threshing bar constructed and arranged in accordance with the principle of the invention.
Figure 3:
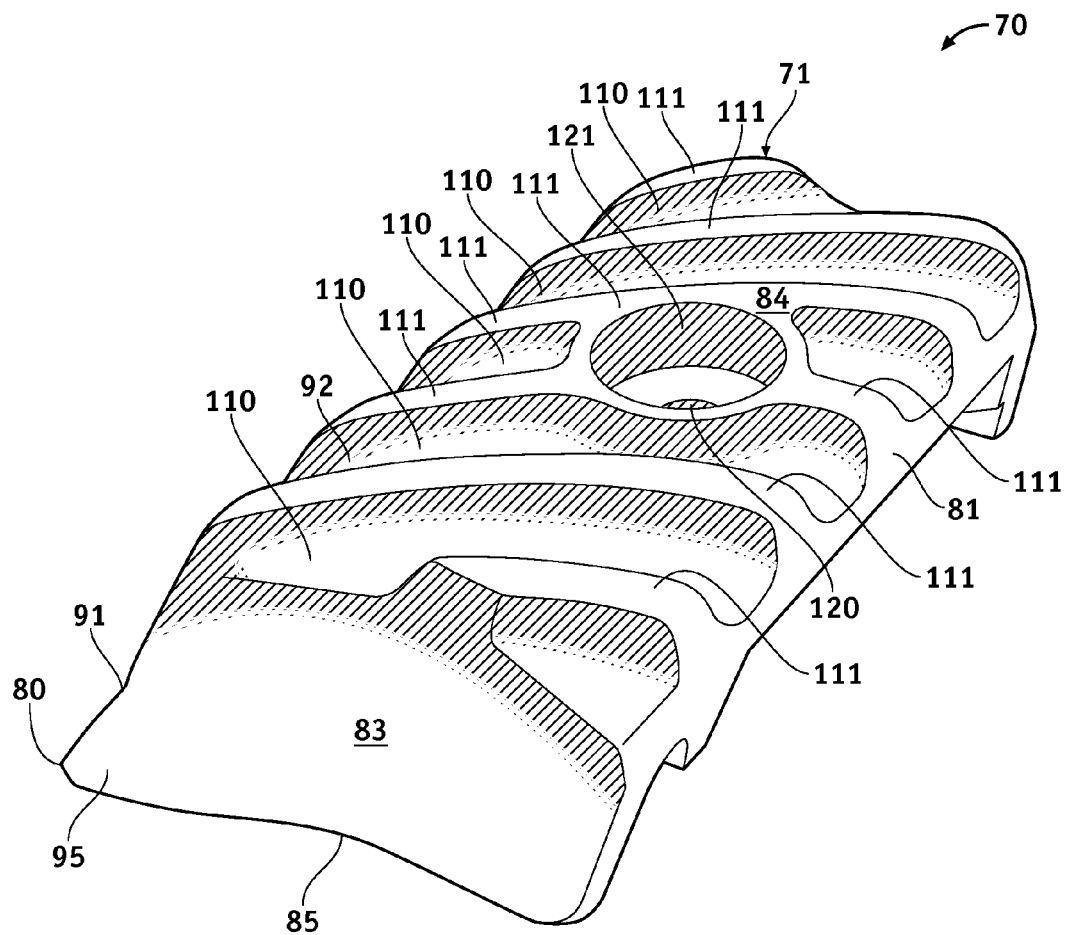
FIG. 3 is a rear perspective view of the embodiment of FIG. 2.
Figure 4:
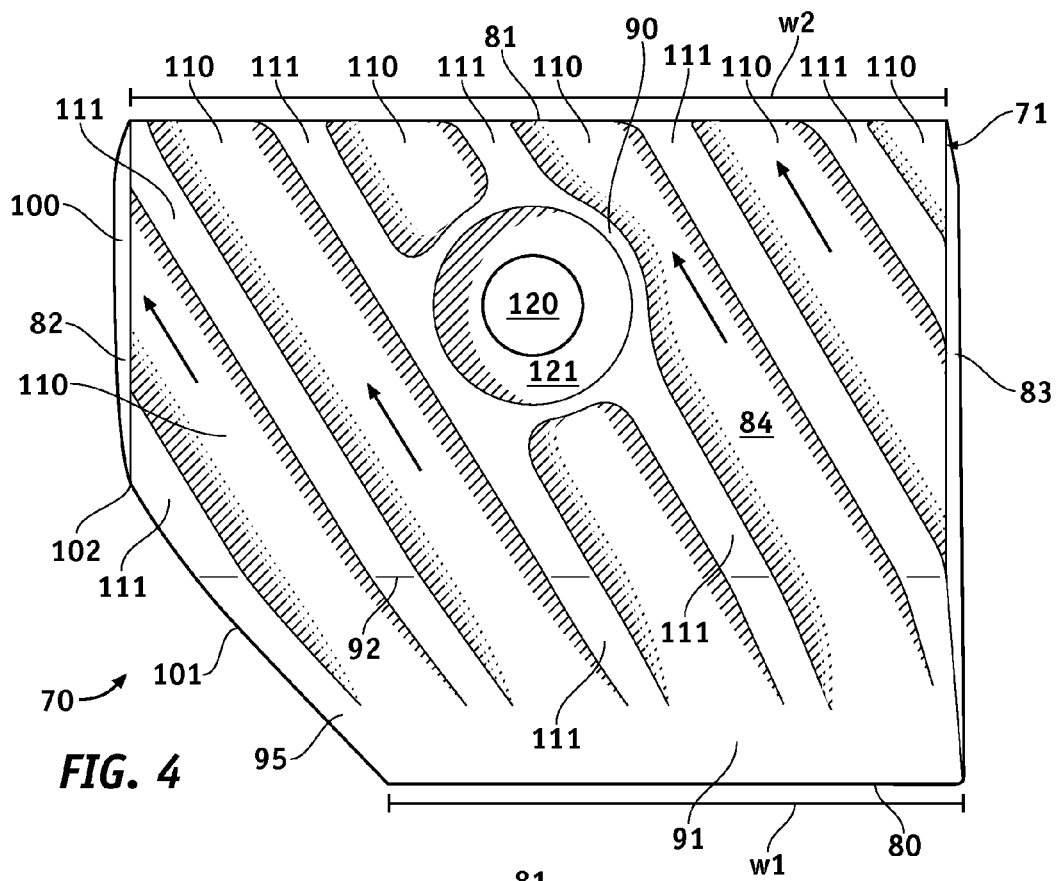
FIG. 4 is a top plan view of the embodiment of FIG. 2.
Figure 5:
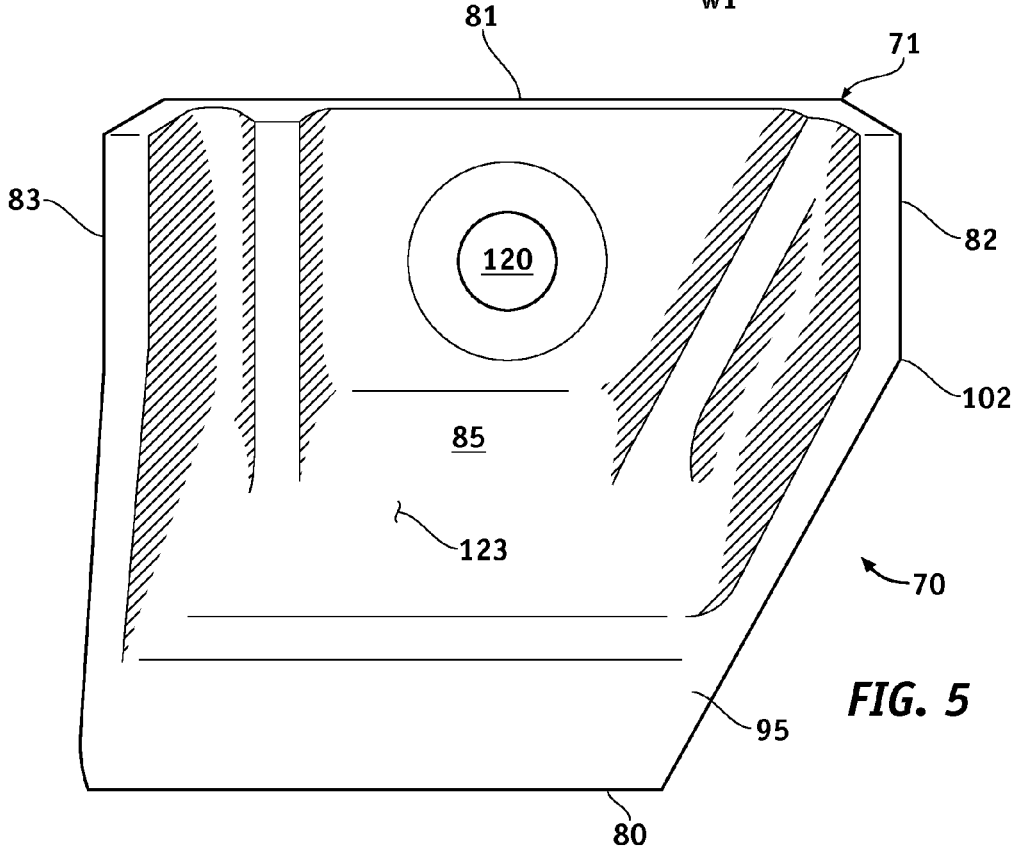
FIG. 5 is a bottom plan view of the embodiment of FIG. 2.
Figure 6:
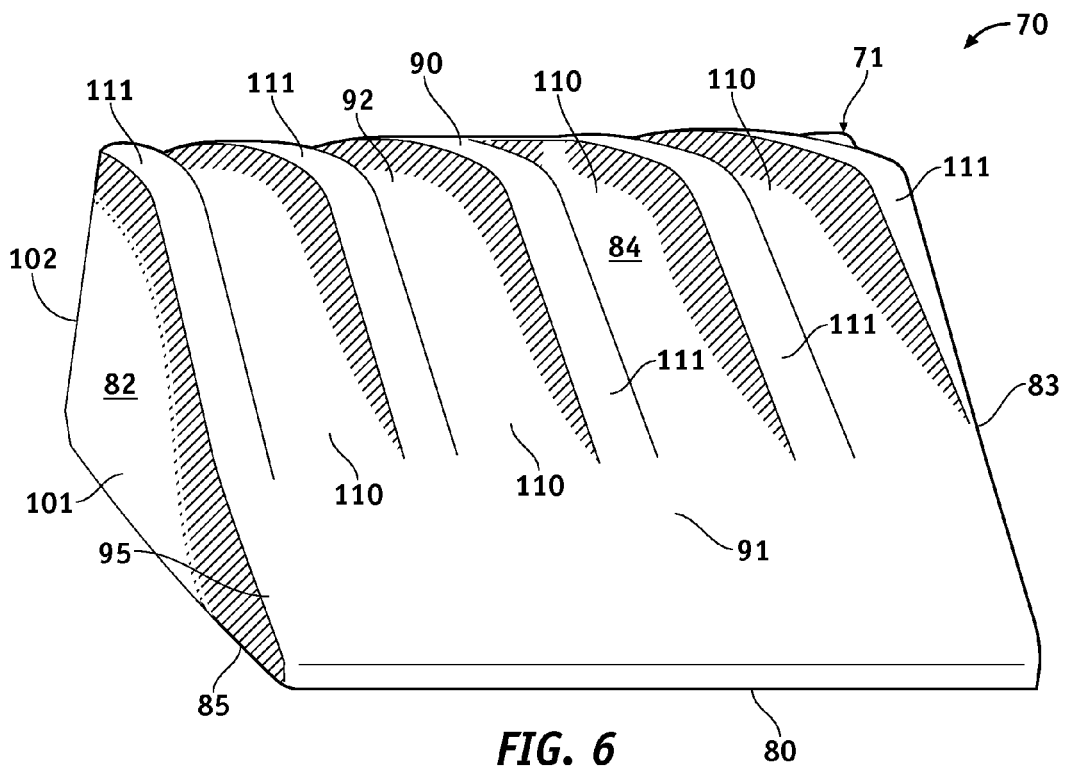
FIG. 6 is a front elevation view of the embodiment of FIG. 2.
Figure 7:
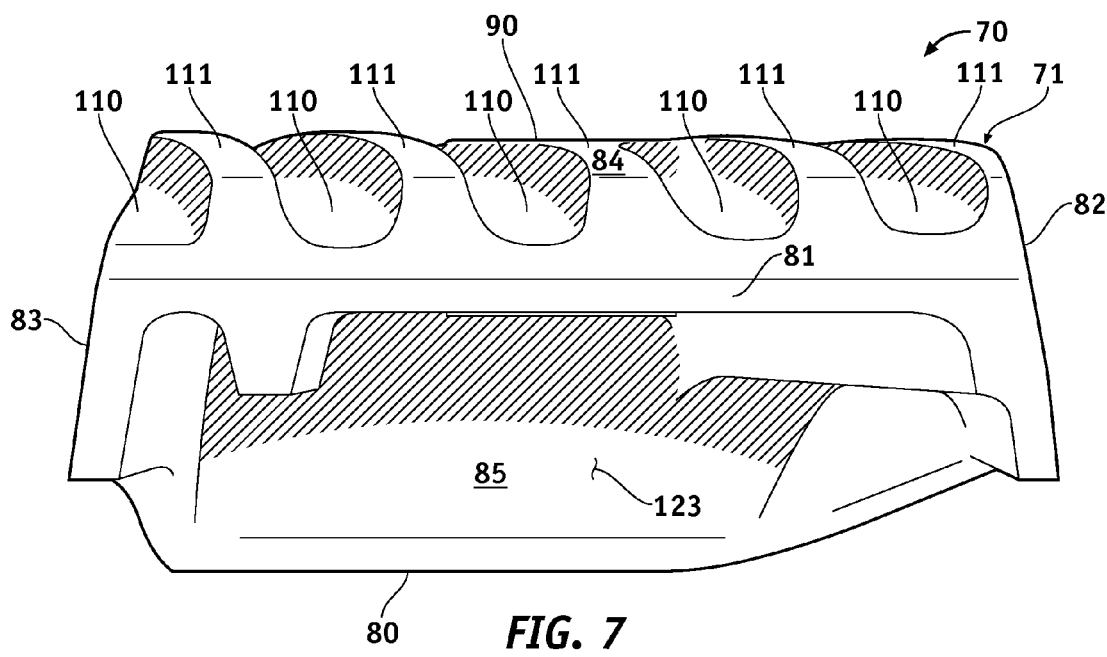
FIG. 7 is a rear elevation view of the embodiment of FIG. 2.
Figure 8:
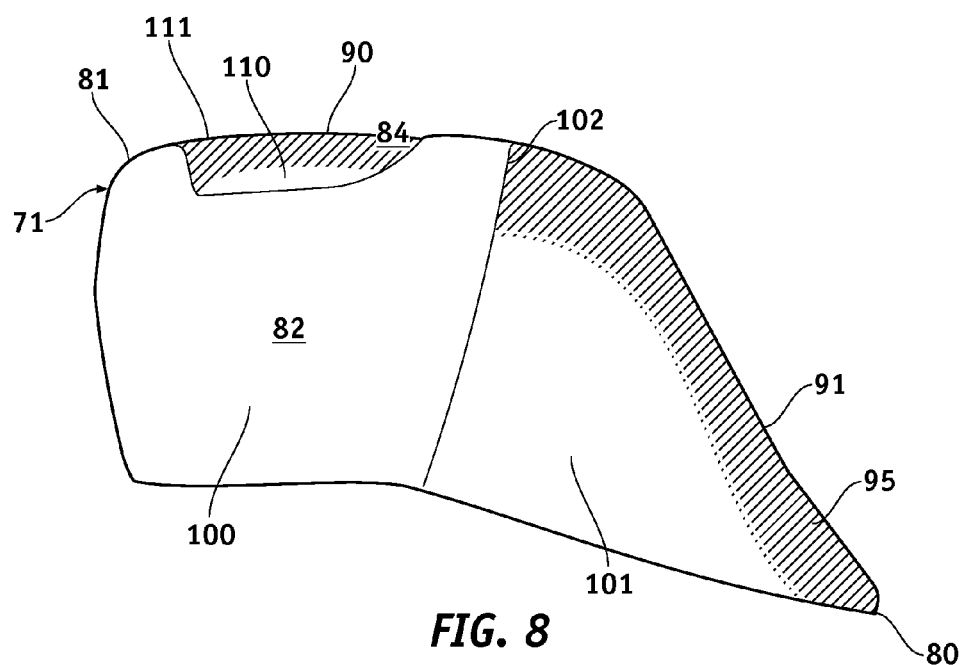
FIG. 8 is a left or upstream side elevation view of the embodiment of FIG. 2.
Figure 9:
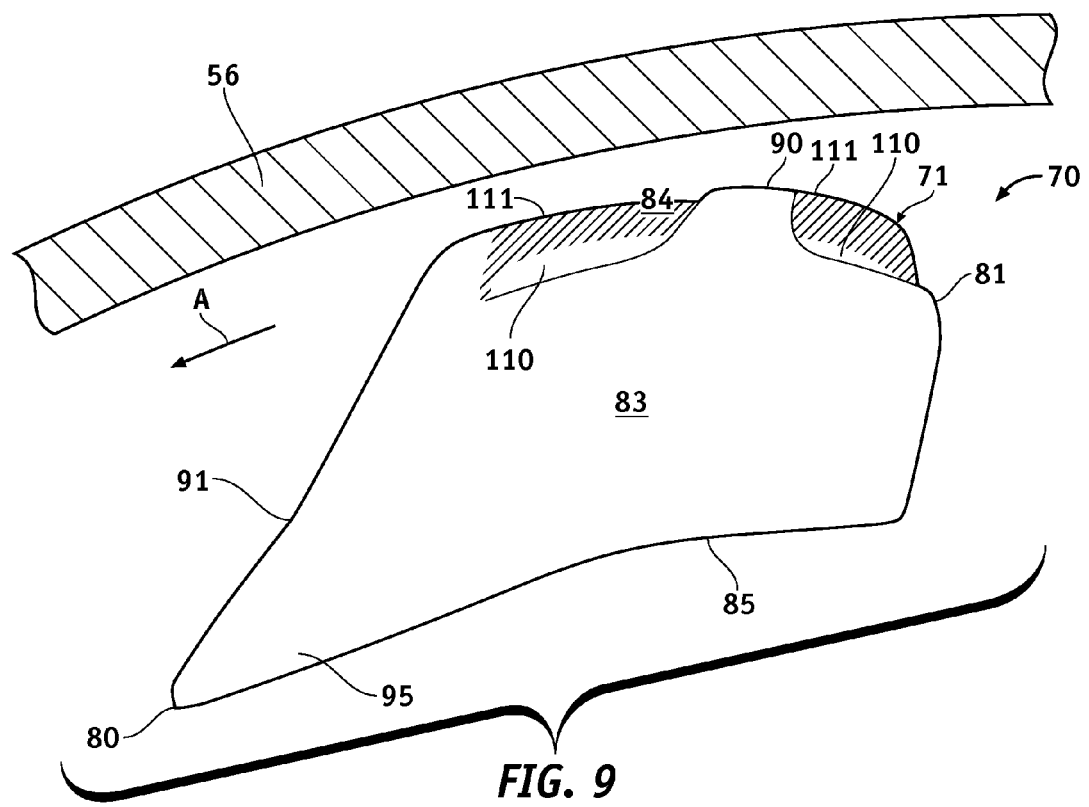
FIG. 9 is a right or downstream side elevation view of the embodiment of FIG. 2 shown as it would appear operatively positioned with respect to a section view of a thresher concave.

FIGS. 2-9 illustrate a first embodiment of a threshing bar denoted at 70 constructed and arranged in accordance with the principle of the invention. FIG. 2 is a front perspective view of threshing bar 70 constructed and arranged in accordance with the principle of the invention, a population of which in a particular embodiment is applied to cylindrical exterior 61 of threshing drum 60 being then part of thresher 55 forming an exemplary thresher embodiment of the invention. FIG. 3 is a rear perspective view of threshing bar 70, FIG. 4 is a top plan view of threshing bar 70, FIG. 5 is a bottom plan view of threshing bar 70, FIG. 6 is a front elevation view of threshing bar 70, FIG. 7 is a rear elevation view of threshing bar 70, FIG. 8 is a left or upstream side elevation view of threshing bar 70, and FIG. 9 is a right or downstream side elevation view of threshing bar 70 shown as it would appear operatively positioned with respect to a section view of thresher concave 56.

Referencing FIGS. 2-9 in relevant part, threshing bar 70 consists of a rigid, integral, unitary threshing body or fixture 71, which is molded of machined of cast iron or steel or other material or combination of materials having the properties of rigidity, resilience, resistance to deformation, and wear resistance. Threshing fixture 71 has a leading edge 80 and an opposed trailing end 81, an upstanding upstream face 82 and an opposed upstanding downstream face 83, a top threshing side 84 and an opposed bottom threshing drum emplacement side 85. Leading edge 80 is parallel with respect to trailing end 81. Leading edge 80 has a width W1 that extends from upstream face 82 to downstream face 83, and trailing end 81 has a width W2 that extends from upstream face 82 to downstream face 83.

Upstream face 82 is located on an upstream end of threshing fixture 71 and extends between top threshing side 84 and opposed bottom threshing drum emplacement side 85 of threshing fixture 71 from leading edge 80 of threshing fixture 71 to trailing end 81 of threshing fixture 71. Downstream face 83 is located on a downstream end of threshing fixture 71 and extends between top threshing side 84 and opposed bottom threshing drum emplacement side 85 of threshing fixture 71 from leading edge 80 of threshing fixture 71 to trailing end 81 of threshing fixture 71.

Top threshing side 84 includes two main surface or face components, namely, a rearward trailing threshing surface or face denoted at 90 and a forward leading threshing surface or face denoted at 91. Trailing threshing face 90 meets leading threshing face 91 at a corner 92 formed in top threshing side 84, which means that trailing threshing face 90 is contiguous with leading threshing face 91 in that trailing threshing face 90 touches leading threshing face 91 at, and along the length of, corner 92. Corner 92 is rounded and blunt and is located between and is parallel with respect to leading edge 80 and trailing end 81 of threshing fixture 71 and extends along top threshing side 84 from upstream face 82 to downstream face 83. Trailing threshing face 90 is a working, threshing, or rasping face and is broad an exposed and extends between opposed upstream and downstream faces 82 and 83 of threshing fixture 71 from trailing end 81 to corner 92. Leading threshing face 91 is a working, threshing, or rasping face and is broad and exposed like trailing threshing face 90, and extends between opposed upstream and downstream faces 82 and 83 of threshing fixture 71 from corner 92 to leading edge 80. Leading and trailing threshing faces 90 and 91 intersect at corner 92. Leading threshing face 91 inclines downwardly away from and relative to trailing threshing face 90 from corner 92 at an average downward incline of 40 degrees and meets, and cooperates with, bottom threshing drum emplacement side 85 and opposed upstream and downstream faces 82 and 83 of threshing fixture 71 at leading edge 80 to form a wedge 95 in threshing fixture 71, which characterized the forward or leading end of threshing fixture 71 opposing trailing end 81 of fixture 71. In the preferred embodiment leading threshing face 91 inclines downwardly from and relative to trailing threshing face 90 from corner 92 at an average incline of 40 degrees and this is an optimal incline of leading threshing face 91 for providing an optimum threshing action along leading threshing face 91. According to the principle of the invention, a preferred range of average inclination of leading threshing face 91 relative to trailing threshing face 90 is from 35 degrees to 45 degrees.

Upstream face 82 includes two main surface components, namely, a rearward surface 100 and a forward surface 101 that meet at corner 102 formed in upstream face 82, which means that rearward surface 100 is contiguous with forward surface 101 in that rearward surface 100 touches forward surface 101 at, and along the length of, corner 102. Corner 102 is formed between leading edge 80 and trailing end 81 of threshing fixture 71 and extends from top threshing side 84 of threshing fixture 71 to bottom threshing drum emplacement side 85 of threshing fixture 71. In a further and more specific aspect, corner 102 is formed between leading edge 80 and trailing end 81 of threshing fixture 71 and extends from trailing threshing face 90 of top threshing side 84 at a location between trailing end 81 of threshing fixture 71 and the intersection of corner 92 with upstream face 82 of threshing fixture 71 and downwardly therefrom to bottom threshing drum emplacement side 85 of threshing fixture 71. Rearward surface 100 of upstream face 82 is broad and is substantially parallel with respect to the downstream face 83 of threshing fixture 71, and extends between trailing threshing face 90 of top threshing side 84 and bottom threshing drum emplacement side 85 of threshing fixture 71 from trailing end 81 to corner 102. Forward surface 101 of upstream face 82 extends between trailing and leading threshing faces 90 and 91 of top threshing side 84 and bottom threshing drum emplacement side 85 of threshing fixture 71 from corner 102 to leading edge 80, tapers from corner 92 to leading edge 80, and is in-turned from rearward surface 100 and toward downstream face 83 of threshing fixture 71 from corner 102 to leading edge 80 of threshing fixture 71 forming an oblique crop material deflecting surface, namely, a surface that is in-turned so as to be oblique with respect to rearward surface 100. As such, width W2 of trailing end 81 is greater than width W1 of leading edge 80. In the preferred embodiment forward surface 101 is in-turned from and relative to rearward surface 100 from corner 102 at an average in-turn or angle of 20 degrees and this provides an optimum deflecting action along forward surface 101. A preferred range of an average in-turn or angle of forward surface 101 relative to rearward surface 100 is from 16 degrees to 25 degrees.

A rasp structure is formed in and along trailing and leading threshing faces 90 and 91 of top threshing side 84 of threshing fixture 71. This rasp structure consists of alternating crop threshing grooves 110 and vanes 111. Crop threshing grooves 110 are formed in top threshing side 84 of threshing fixture 71, which form and are separated by corresponding upstanding vanes 111. Vanes 111 are elongate and have an equal and generally uniform height and width relative to each other, and grooves 110 are similarly elongate and correspond in length to the lengths of the corresponding vanes 111 and have a generally equal and uniform width and depth relative to each other. Grooves 110 and corresponding vanes 111 are formed in trailing threshing face 90 of top threshing side 84 of threshing fixture 71 and are formed in leading threshing face 91 of top threshing side 84 of threshing fixture 71. Grooves 110 and corresponding vanes 111 extend along threshing fixture 71 in a direction from trailing end 81 of threshing fixture 71 to leading edge 80 of threshing fixture 71. More specifically, grooves 110 and corresponding vanes 111 further extend along top threshing side 84 of threshing fixture 71 from trailing end 81 of threshing fixture 71 to corner 92 formed in top threshing side 84 of threshing fixture 71. Grooves 110 and corresponding vanes 111 further extend downwardly along leading threshing face 91 of top threshing side 84 of threshing fixture 71 from corner 92 and, in the present embodiment, terminate along leading threshing face 91 at an intermediate location relative to corner 92 and leading edge 80 of threshing fixture 71.

Grooves 110 and corresponding vanes 111 are parallel relative to each other, and are substantially parallel relative to the oblique crop material deflecting surface defined by forward surface 101 of upstream face 82 of threshing fixture 71, and are oblique relative to leading edge 80 of threshing fixture 71 and also, for reference purposes, rearward surface 100 of upstream face 82 of threshing fixture 71. As such, grooves 110 and corresponding vanes 111 are downstream directed grooves and vanes in that they are angled away from trailing rearward surface 100 of upstream face 82 at the upstream end of threshing fixture 71 toward downstream face 83 at the downstream end of threshing fixture 71. Grooves 110 and corresponding vanes 111 forming the rasp structure of threshing fixture 71 define crop material conveyance pathways that extend along or otherwise across top threshing side 84 of fixture 71 in the opposite direction along threshing fixture 71 being a direction from leading edge 80 to trailing end 81 and, more particularly, in an angled direction from downstream side 83 of fixture 71 toward upstream side 82 of fixture 71. Grooves 110 and corresponding vanes 111 are substantially parallel relative to the oblique crop material deflecting surface defined by forward surface 101 of upstream face 82 of threshing fixture 71, in which the term "substantially parallel" means parallel within a deviation range of from zero to approximately 6 degrees, whereby in the present embodiment there is a deviation of approximately four degrees. And so within this range of deviation, grooves 110 and corresponding vanes 111 are substantially parallel relative to the oblique crop material deflecting surface defined by forward surface 101 of upstream face 82 of threshing fixture 71.

Figure 41:
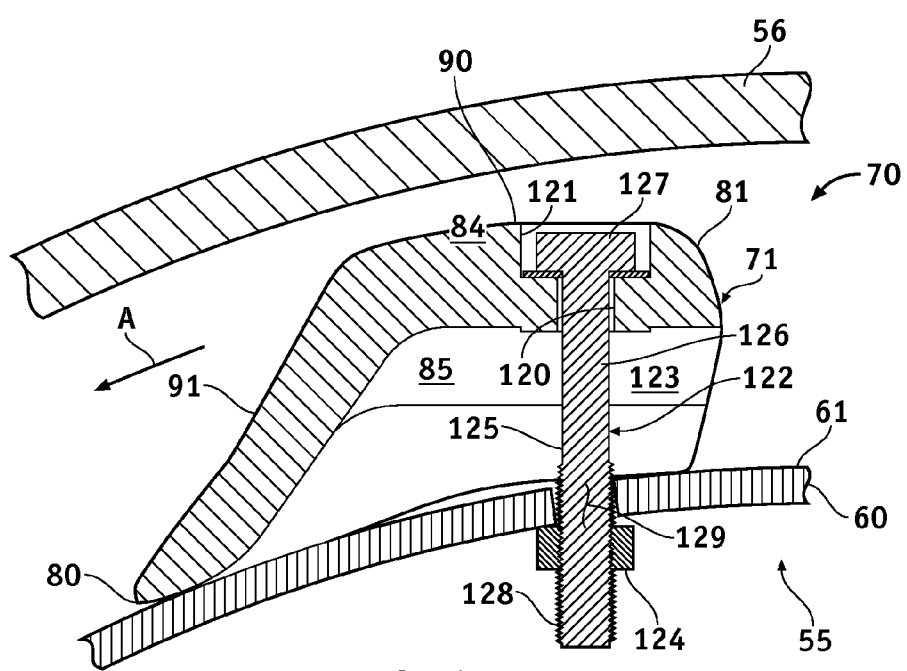
FIG. 41 is a section view taken along line 41-41 of FIG. 40.

Referencing FIGS. 2, 3, 4, and 5, threshing fixture 71 is formed with bore 120 and a corresponding counterbore 121 used to accept, as shown in FIG. 41, a nut-and-bolt fastener 122 for securing threshing bar 70 to cylindrical exterior 61 of threshing drum 60 referenced in FIG. 41. Bore 120 and corresponding counterbore 121 are formed at an intermediate location between downstream face 83 and rearward surface 100 of upstream face 82. Bore 120 and corresponding counterbore 121 are located at an intermediate location between corner 92 and trailing end 81 of threshing fixture 71, and extend through fixture 71 from trailing threshing face 90 of top threshing side 84 of threshing fixture 71 to a cavity 123 formed in bottom threshing drum emplacement side 85 of threshing fixture 71. Counterbore 121 is directed inwardly to bore 120 through trailing threshing face 90 of top threshing side of threshing fixture 71.

Referencing FIG. 41, nut-and-bolt assembly 122 consists of nut 124 and a corresponding bolt 125 that includes an elongate shank 126 having a head 127 and an opposed threaded end 128. In the installation of threshing bar 70, bottom threshing drum emplacement side 85 of threshing bar 70 is set onto cylindrical exterior 61 of threshing drum 60, and threshing side 84 of threshing bar 70 and the rasp structure formed therein faces outwardly toward and confronts thresher concave 56. Threshing bar 70 is positioned so as to direct leading edge 80 and leading threshing face 91 into the threshing direction of rotation of threshing drum 60 indicated by arrowed line A, so as to direct upstream face 82 toward the upstream end or location of threshing drum 60, and so as to direct downstream face 83 toward the downstream end or location of threshing drum 60, whereby in response to rotation of threshing drum 60 in the threshing direction of rotation threshing bar 70 leads with leading edge 80 and trails with trailing end 81 and a crop applied between cylindrical exterior 61 of threshing drum 60 and thresher concave 56 is threshed by and between top threshing side 84 of threshing bar 70 and thresher concave 56. Bottom threshing drum emplacement side 85 of threshing bar 70 is contoured to be received by cylindrical exterior 61 of threshing drum 60.

In the installation of nut-and-bolt assembly 122 as shown in FIG. 41, head 127 is set into and is received by counterbore 121 such that it is located under top threshing side 84 so as not to interfere with the threshing action carried out by grooves 110 and corresponding vanes 111 formed in top threshing side 84. Shank 126 extends downwardly from head 127 through bore 120 and into and through cavity 123 to threaded end 128, which is applied through an opening 129 formed through threshing drum 60. Nut 124 is threaded onto threaded end 128 of shank 126 along the underside of threshing drum 60 and is tightened to firmly and rigidly secure threshing bar 70 in place relative to cylindrical exterior 61 of threshing drum 60.

Figure 34:
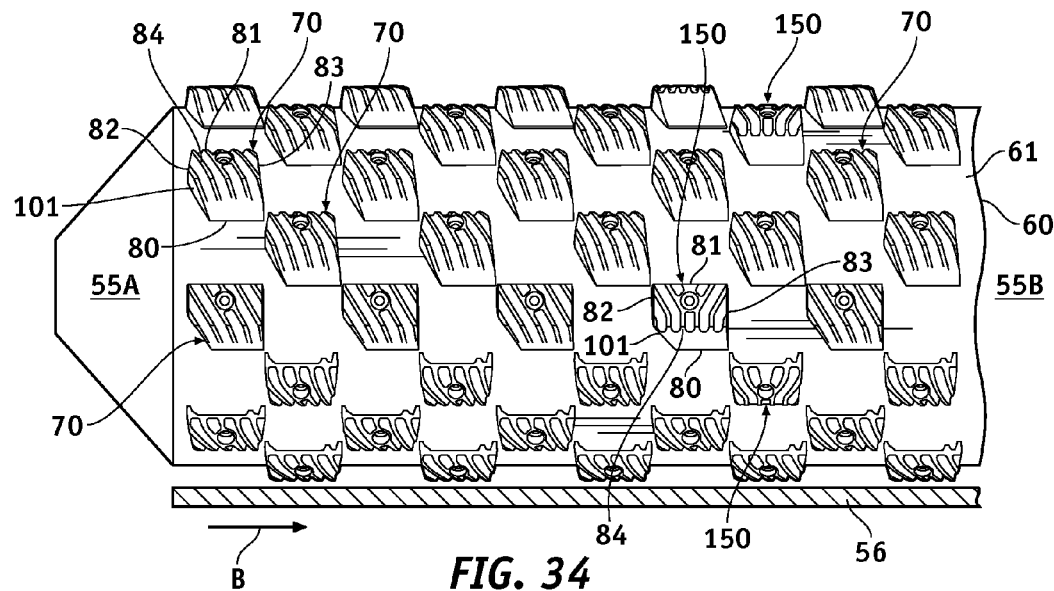
FIGS. 34-39 are fragmented, front elevation views of threshing drums formed with different configurations of threshing bars constructed and arranged in accordance with the principle of the invention.

In a particular embodiment, a population of threshing bars 70 is emplaced and affixed to cylindrical exterior of threshing drum 60, as generally depicted in FIGS. 1, 34, and 40, to form an exemplary thresher 55 according to the principle of the invention. In FIG. 34, threshing bars are denoted at 70, and are shown set onto cylindrical exterior 61 of threshing drum 60 in preparation for threshing. Threshing bars 70 are positioned with their leading edges 80 and leading threshing faces 91 facing or otherwise directed into the threshing direction of rotation of threshing drum 60 indicated by arrowed line A so to direct their upstream faces 82 toward the upstream location 55A of threshing drum, and so as to direct their downstream faces 83 toward the downstream location 55B of threshing drum 60. Because upstream faces 82 of threshing bars 70 are directed toward upstream location of threshing drum 60, the oblique crop material deflecting surface defined by forward surface 101 of upstream face 82 of each threshing bar 70 also faces upstream location 55A of threshing drum 60, and is oblique and angled toward upstream location 55A of threshing drum 60 relative to the threshing direction of rotation of threshing drum 60 as indicated by arrowed line A. In response to rotation of threshing drum 60 in the threshing direction of rotation denoted by arrowed line A threshing bars 70 lead with their leading edges 80 and trail with their trailing ends 81 and crop cuttings applied between cylindrical exterior 61 of threshing drum 60 and thresher concave 56 are threshed by and between rasp structures formed in the top threshing sides 84 of threshing bars 70 and thresher concave 56 separating the grains from the chaff to form threshings, namely, the chaff and the separated grains. A conveyance (not shown) of combine harvester 50, such as an auger, conveys the threshings along the rotating thresher 55 in a direction indicated by arrowed line B from upstream location 55A of thresher 55 to downstream location 55B of thresher 55 where the grains fall through sieves 57 into collection tank 58 inside combine harvester 50 as shown in FIG. 1.

Referencing FIGS. 2, 9, 34, and 41 in relevant part, as each threshing bar 70 is rotated by threshing drum 60 along the threshing direction of rotation the crop cuttings to be threshed are received between top threshing face 84 of threshing bar 70 and thresher concave 56 (shown in FIGS. 9 and 41), in which the crop cuttings to be threshed are applied to and across top threshing face 84 and encounter top threshing face 84 from leading edge 80 to trailing end 81 and impact first leading threshing face 91 and then impact and encounter the rasp structure consisting of grooves 110 and corresponding vanes 111 applied along leading threshing face 91 and trailing threshing face 90 imparting a threshing action against the crop cuttings to form threshings. The previously described incline of leading threshing face 91 relative to trailing threshing face 90, and the grooves 110 and corresponding vanes 111 forming the rasp structure along leading threshing face 91 and trailing threshing face 90 cooperate to cause threshing bar 70 to perform an aggressive threshing of the crop cuttings to be threshed. In fact, leading threshing face 91 faces upwardly toward thresher concave 56 and faces into the threshing direction of rotation of threshing drum 60 indicated by arrowed line A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as described thus provides an aggressive initial impaction against the crop cuttings in the threshing of such crop cuttings but not so aggressive so as to cause an initial over-threshing of the crop cuttings, in accordance with the principle of the invention. Because grooves 110 and corresponding vanes 111 are downstream directed grooves and vanes in that they are angled away from trailing rearward surface 100 of upstream face 82 at the upstream end of threshing fixture 71 toward downstream face 83 at the downstream end of threshing fixture 71, in response to movement of threshing bar 70 along the threshing direction of rotation of threshing drum 60 leading with leading edge 80 the crop cuttings and threshings are forced along the vanes 111 and into and through the grooves 110 defining the crop material conveyance pathways of the rasp structure of threshing fixture 71 in a rearward direction from leading edge 80 to trailing end 81 and further in an angled direction from downstream side 83 of fixture 71 toward upstream side 82 of fixture 71 and are thrust outwardly therefrom toward upstream location 55A of threshing drum 60 and away from upstream face 82. This thrusting of crop cuttings and threshings along and through the crop material conveyance pathways defined by the rasp structure of threshing fixture 71 toward upstream location 55A of threshing drum slows the conveyance of this material along thresher 55 from upstream location 55A to downstream location 55B thereby prolonging the applied threshing action to the crop cuttings to provided a thorough, repeated, more prolonged, and aggressive threshing of the crop cuttings to be threshed as thresher 55 rotates. And so the rasp structure formed by grooves 110 and corresponding vanes 111 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 110 and corresponding vanes 111. The rasp structure of threshing fixture 71 defined by grooves and corresponding vanes 111 as herein described reduces the possibility of over-threshing, prevents cracks and splits in seed coats, and is suitable for all crops, and especially corn, beans, and small grain crops.

FIG. 34 illustrates a population of threshing bars 70 applied to cylindrical exterior 61 of threshing drum 60 in a pattern extending between upstream location 55A of thresher 55 and downstream location of thresher 55. As each threshing bar 70 is rotated along the threshing direction of rotation, it is to be emphasized that part of the crop cuttings to be threshed impacts the oncoming oblique crop material deflecting surface defined by forward surface 101 of upstream face 82, which deflects the crop cuttings outwardly therefrom toward upstream location 55A of threshing drum 60 and away from upstream face 82. This deflection of crop cuttings toward upstream location 55A of threshing drum 60 as deflected by forward surface 101 of upstream face 82 further slows the conveyance of this material along thresher 55 from upstream location 55A to downstream location 55B thereby prolonging the applied threshing action to the crop cuttings to provide a thorough, repeated, more prolonged, and aggressive threshing of the crop cuttings to be threshed as thresher 55 rotates.

Figure 10:
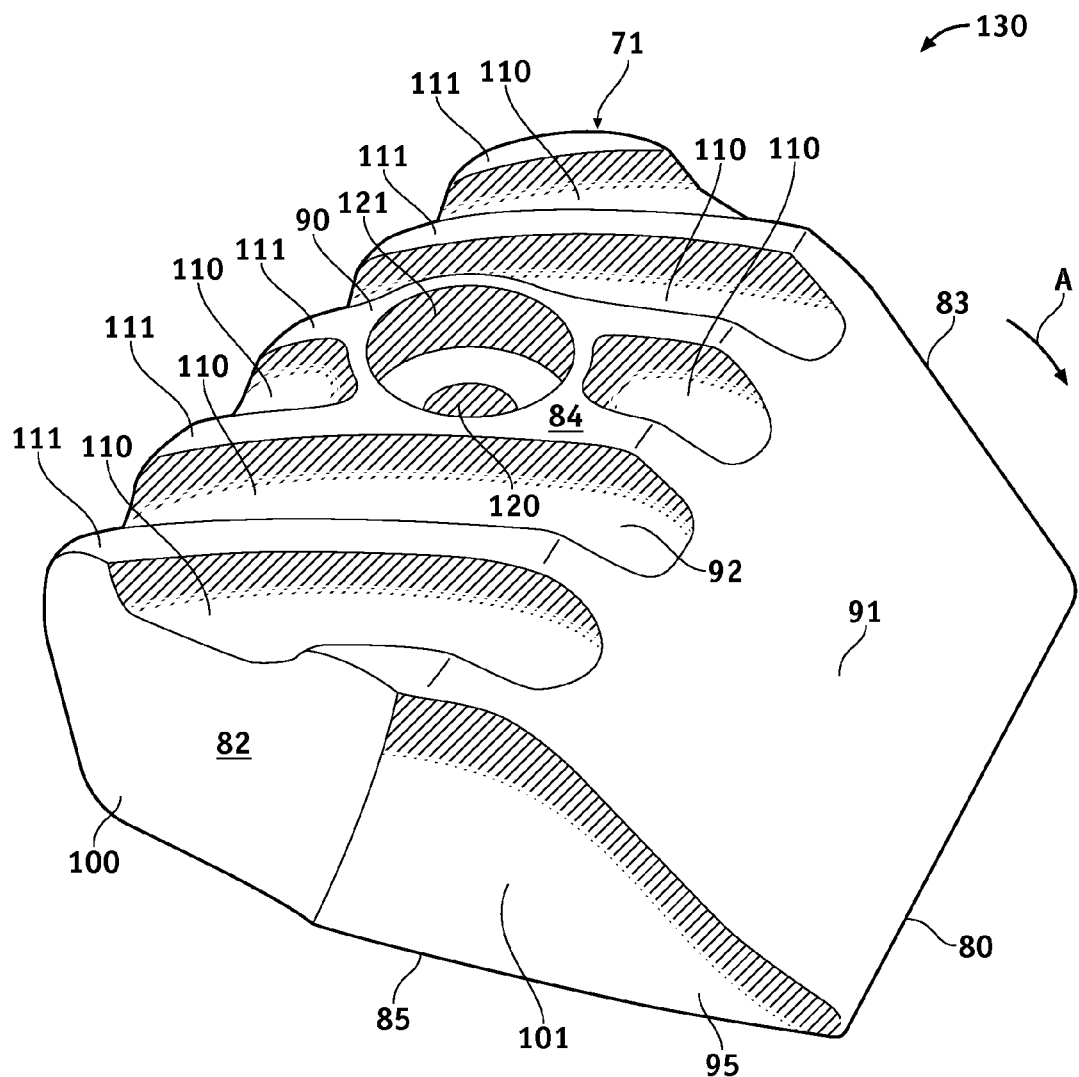
FIG. 10 is a front perspective view of another embodiment of a threshing bar constructed and arranged in accordance with the principle of the invention.
Figure 11:
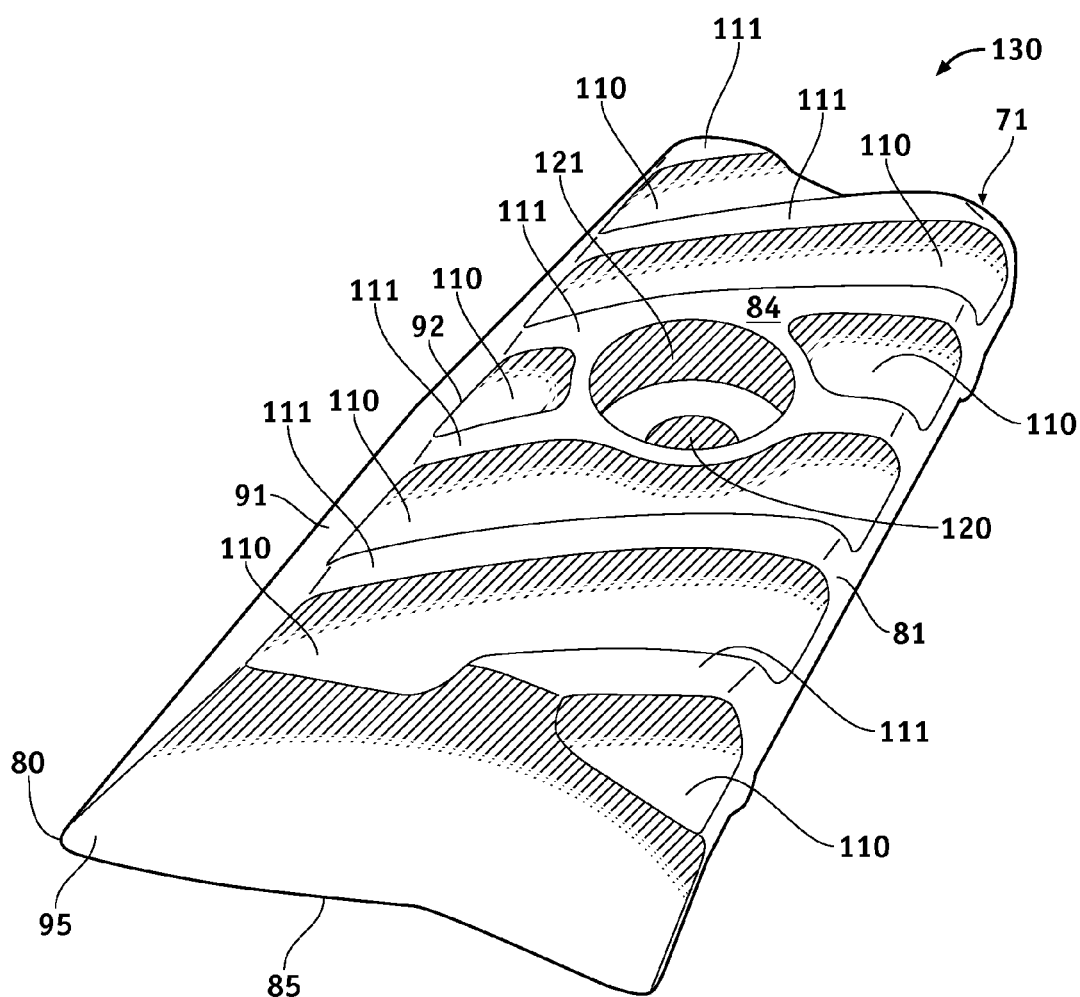
FIG. 11 is a rear perspective view of the embodiment of FIG. 10.
Figure 12:
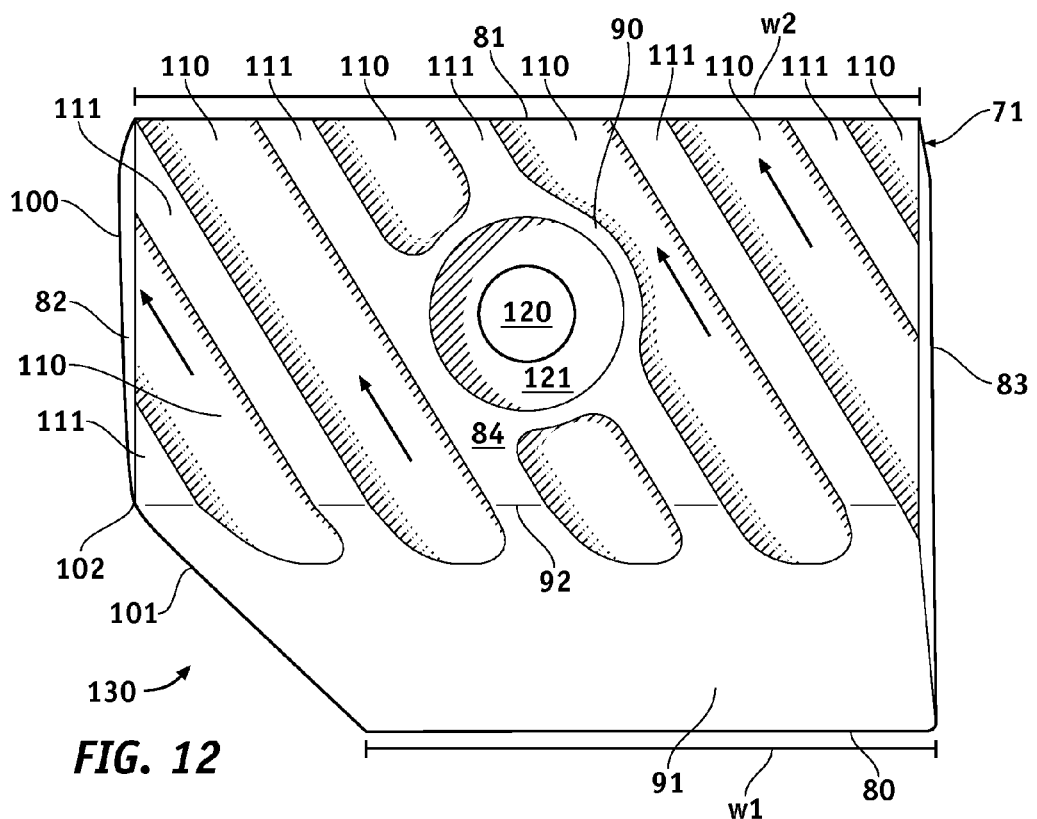
FIG. 12 is a top plan view of the embodiment of FIG. 10.
Figure 13:
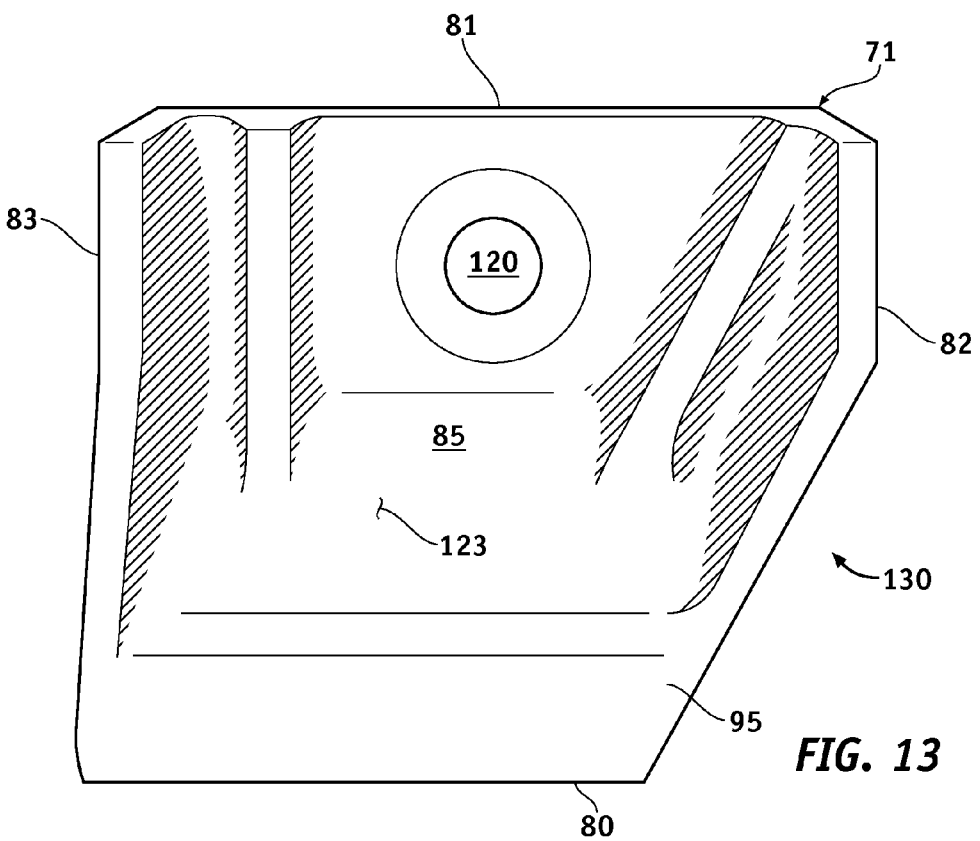
FIG. 13 is a bottom plan view of the embodiment of FIG. 10.
Figure 14:
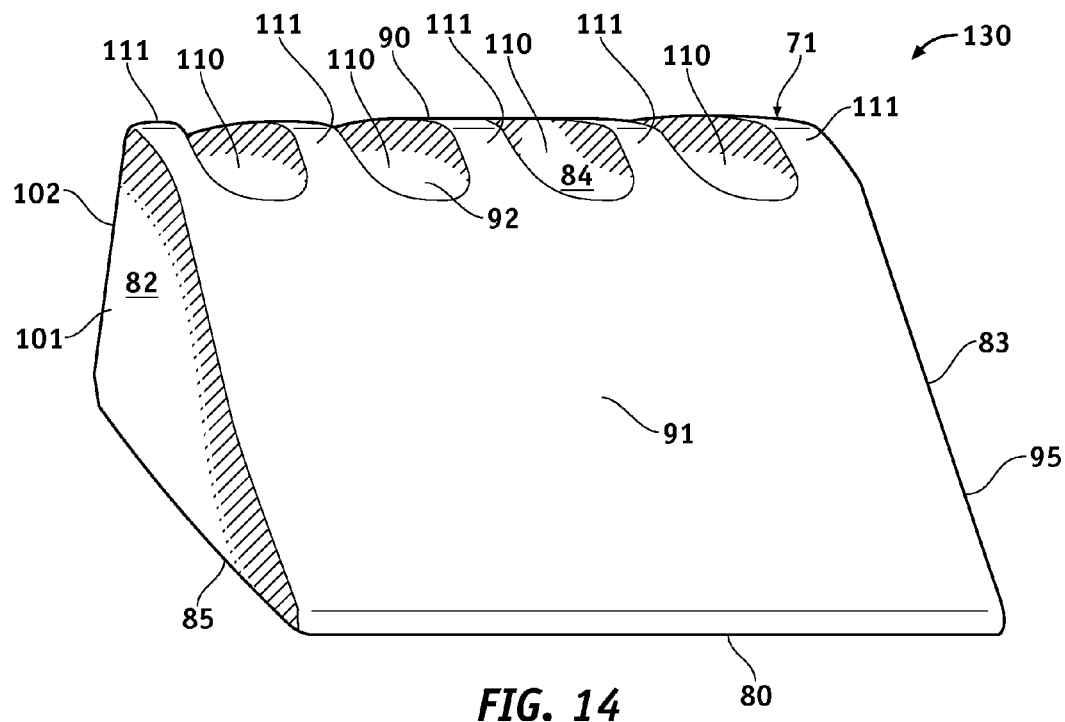
FIG. 14 is a front elevation view of the embodiment of FIG. 10.
Figure 15:
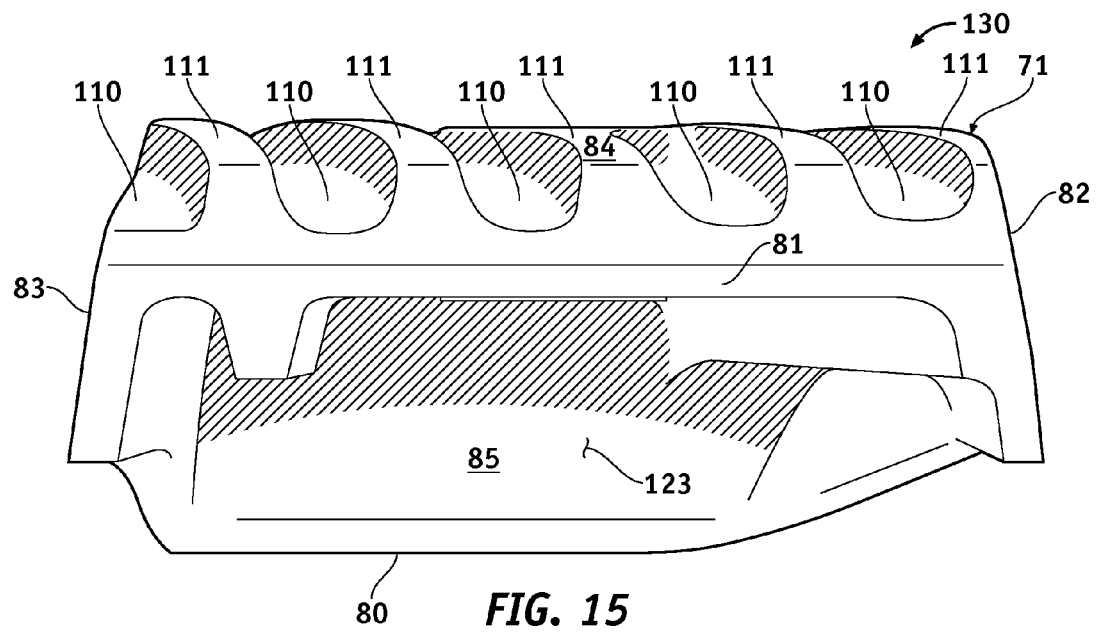
FIG. 15 is a rear elevation view of the embodiment of FIG. 10.
Figure 16:
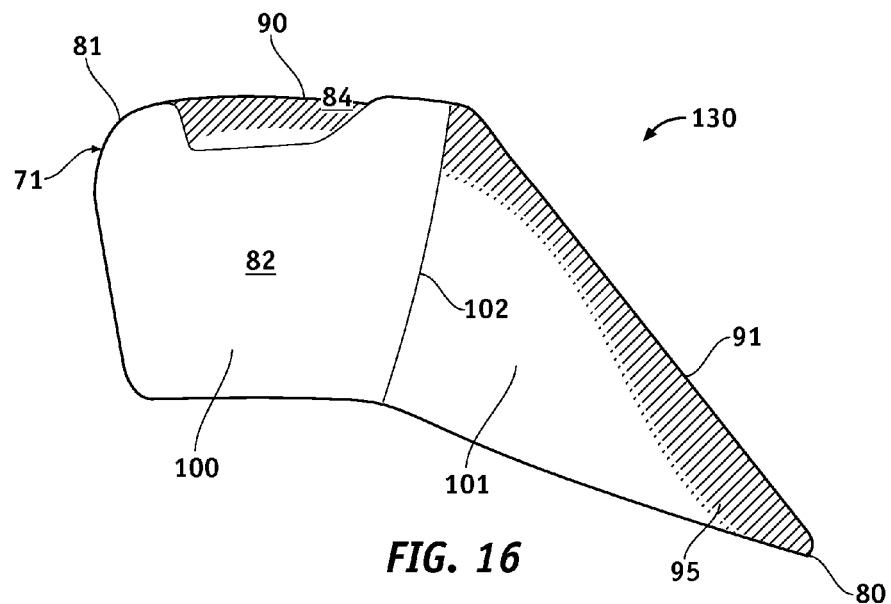
FIG. 16 is a left or upstream side elevation view of the embodiment of FIG. 10.
Figure 17:
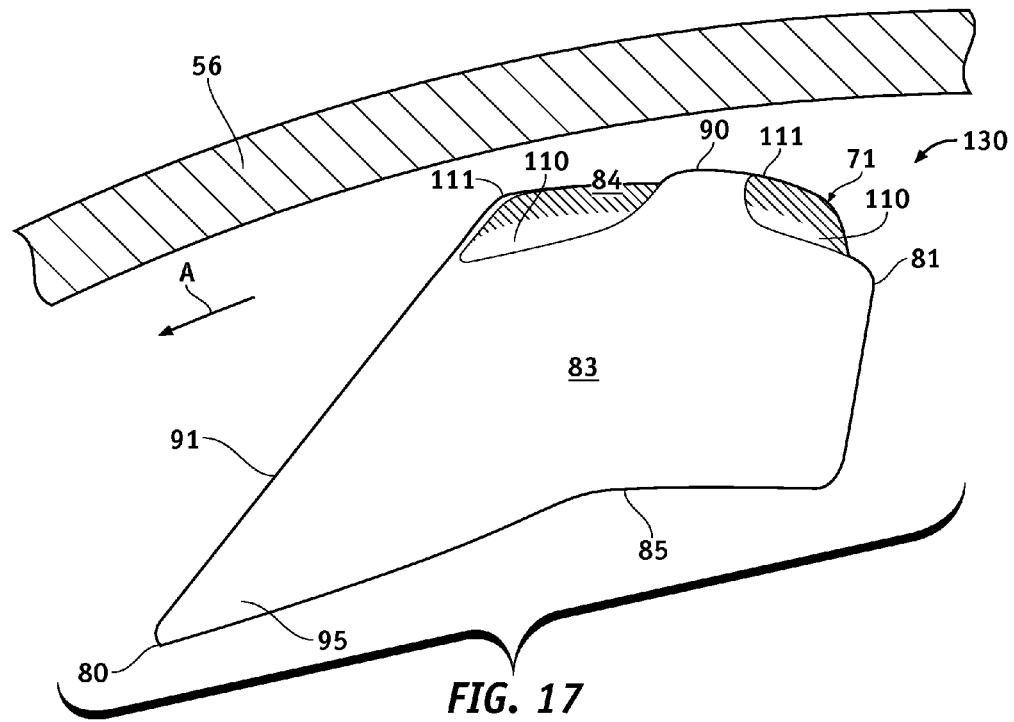
FIG. 17 is a right or downstream side elevation view of the embodiment of FIG. 10 shown as it would appear operatively positioned with respect to a section view of a thresher concave.

FIGS. 10-17 illustrate a second embodiment of a threshing bar 130 constructed and arranged in accordance with the principle of the invention. FIG. 10 is a front perspective view of threshing bar 130, a population of which in a particular embodiment is applied to cylindrical exterior 61 of threshing drum 60 being then part of thresher 55 forming an exemplary thresher embodiment of the invention. FIG. 11 is a rear perspective view of threshing bar 130, FIG. 12 is a top plan view of threshing bar 130, FIG. 13 is a bottom plan view of threshing bar 130, FIG. 14 is a front elevation view of threshing bar 130, FIG. 15 is a rear elevation view of threshing bar 130, FIG. 16 is a left or upstream side elevation view of threshing bar 130, and FIG. 17 is a right or downstream side elevation view of threshing bar 130 shown as it would appear operatively positioned with respect to a section view of thresher concave 56.

Referencing FIGS. 10-17 in relevant part, threshing bar 130 is somewhat different from threshing bar 70 in overall shape, but in structure is common to threshing bar 70 as threshing bar 130 shares fixture 71, including leading edge 80 having width W1, trailing end 81 having width W2 that is greater than width W1 of leading edge 80, upstream face 82, downstream face 83, top threshing side 84, bottom threshing drum emplacement side 85, trailing threshing face 90, leading threshing face 91, corner 92, wedge 95, rearward surface 100, forward surface 101, corner 102, grooves 110 and corresponding vanes 111, bore 120 and corresponding counterbore 121 to accommodate a nut-and-bolt fastener for securing threshing bar 130 to cylindrical exterior 61 of threshing drum 60 referenced in connection with threshing bar 70 in FIG. 41, and cavity 123.

A rasp structure is formed in and along trailing threshing face 90 of top threshing side 84 of threshing fixture 71 of threshing bar 130. This rasp structure of threshing bar 130 consists of alternating crop threshing grooves 110 and vanes 111. Crop threshing grooves 110 are formed in top threshing side 84 of threshing fixture 71 of threshing bar 130, which form and are separated by corresponding upstanding vanes 111. Vanes 111 are elongate and have an equal and generally uniform height and width relative to each other, and grooves 110 are similarly elongate and correspond in length to the lengths of the corresponding vanes 111 and have a generally equal and uniform width and depth relative to each other. Grooves 110 and corresponding vanes 111 are formed in trailing threshing face 90 of top threshing side 84 of threshing fixture 71, and extend along threshing fixture 71 in a direction from trailing end 81 of threshing fixture 71 to leading edge 80 of threshing fixture 71, and extend from trailing end 81 of threshing fixture 71 to corner 92 formed in top threshing side 84 of threshing fixture 71.

Grooves 110 and corresponding vanes 111 are parallel relative to each other, and are still further substantially parallel relative to the oblique crop material deflecting surface defined by forward surface 101 of upstream face 82 of threshing fixture 71, and are oblique relative to leading edge 80 of threshing fixture 71 and also, for reference purposes, rearward surface 100 of upstream face 82 of threshing fixture 71. As such, grooves 110 and corresponding vanes 111 are downstream directed grooves and vanes in that they are angled away from trailing rearward surface 100 of upstream face 82 at the upstream end of threshing fixture 71 toward downstream face 83 at the downstream end of threshing fixture 71. Grooves 110 and corresponding vanes 111 define crop material conveyance pathways that extend along or otherwise across top threshing side 84 of fixture 71 in the opposite direction along threshing fixture 71 being a direction from leading edge 80 to trailing end 81 and, more particularly, in an angled direction from downstream side 83 of fixture 71 toward upstream side 82 of fixture 71. Grooves 110 and corresponding vanes 111 are substantially parallel relative to the oblique crop material deflecting surface defined by forward surface 101 of upstream face 82 of threshing fixture 71, in which the term "substantially parallel" as explained in connection with threshing bar 70 means parallel within a deviation range of from zero to approximately 6 degrees, whereby in the present embodiment there is a deviation of approximately four degrees. And so within this range of deviation, grooves 110 and corresponding vanes 111 are substantially parallel relative to the oblique crop material deflecting surface defined by forward surface 101 of upstream face 82 of threshing fixture 71. Unlike threshing bar 70, grooves 110 and corresponding vanes 111 extend to and terminate at leading threshing face 91 at corner 92, and do not further extend downwardly along leading threshing face 91 of top threshing side 84 of threshing fixture 71 from corner 92 leaving leading threshing face 91 bare and free of a rasp structure.

Figure 35:
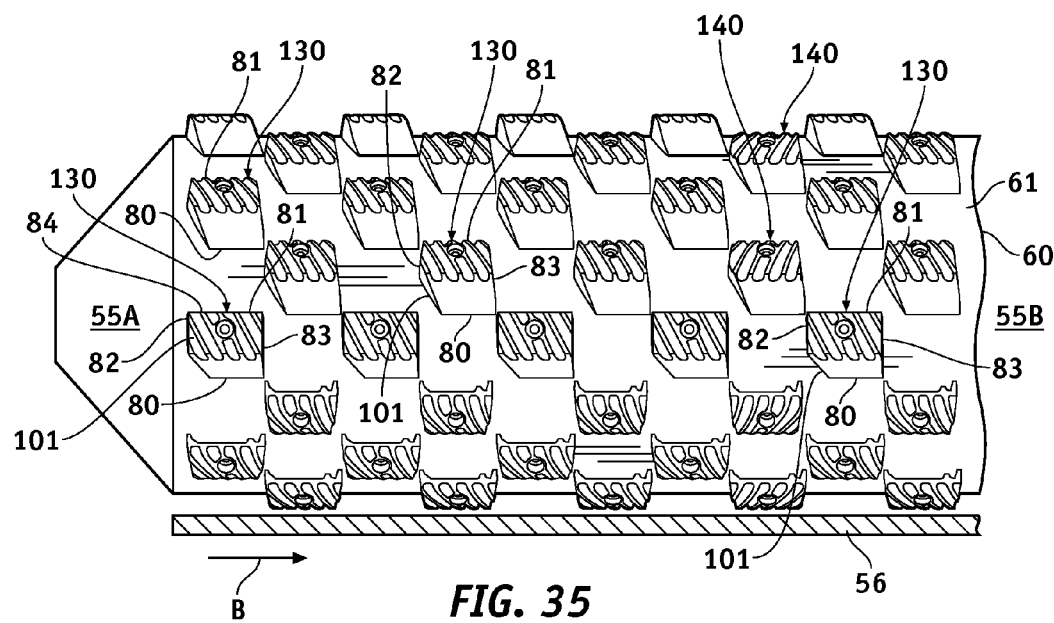

Threshing bar 130 is applied and secured to a cylindrical exterior of a threshing drum and positioned in the same way as threshing bar 70 previously discussed and which is shown in FIG. 17, whereby threshing side 84 of threshing bar 130 and the rasp structure formed therein faces outwardly toward and confronts thresher concave 56. A threshing drum may be formed with a population of threshing bars 130 applied in a regular or specified pattern across the cylindrical exterior as shown in FIG. 35. In FIG. 35 threshing bars 130 are shown set onto cylindrical exterior 61 of threshing drum 60 in preparation for threshing. Threshing bars 130 are positioned with their leading edges 80 and leading threshing faces 91 directed into the threshing direction of rotation of threshing drum 60 indicated by arrowed line A so to direct their upstream faces 82 toward the upstream location 55A of threshing drum, and so as to direct their downstream faces 83 toward the downstream location 55B of threshing drum 60. Because upstream faces 82 of threshing bars 130 are directed toward upstream location of threshing drum 60, the oblique crop material deflecting surface defined by forward surface 101 of upstream face 82 of each threshing bar 130 also faces upstream location 55A of threshing drum 60, and is oblique and angled toward upstream location 55A of threshing drum 60 relative to the threshing direction of rotation of threshing drum 60 as indicated by arrowed line A. In response to rotation of threshing drum 60 in the threshing direction of rotation denoted by arrowed line A threshing bars 130 lead with their leading edges 80 and trail with their trailing ends 81 and crop cuttings applied between cylindrical exterior 61 of threshing drum 60 and thresher concave 56 are threshed by and between top threshing sides 84 of threshing bars 130 and thresher concave 56 separating the grains from the chaff to form threshings, namely, the chaff and the separated grains. A conveyance (not shown) of combine harvester 50, such as an auger, conveys the threshings along the rotating thresher 55 in a direction indicated by arrowed line B from upstream location 55A of thresher 55 to downstream location 55B of thresher 55 where the grains fall through sieves 57 into collection tank 58 inside combine harvester 50 as shown in FIG. 1.

As each threshing bar 130 is rotated along the threshing direction of rotation A the crop cuttings to be threshed are received between top threshing face 84 of threshing bar 130 and thresher concave 56, in which the crop cuttings to be threshed are applied to and across and encounter top threshing face 84 from leading edge 80 to trailing end 81 and encounter and impact first leading threshing face 91 and then impact and encounter grooves 110 and corresponding vanes 111 applied along trailing threshing face 90 imparting a threshing action against the crop cuttings to be threshed to separate the chaff from the grain of the crop cuttings to form threshings. The application of grooves 110 and corresponding vanes 111 along just trailing threshing face 90 and with leading threshing face 91 of threshing bar 130 being bare and free of rasp structure causes threshing bar 130 to perform a less aggressive threshing of the crop cuttings to be threshed compared to the threshing action performed by threshing bar 70. And so the rasp structure formed by grooves 110 and corresponding vanes 111 of threshing bar 130 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 110 and corresponding vanes 111. The rasp structure of threshing fixture 71 of threshing bar 130 defined by grooves 110 and corresponding vanes 111 as herein described reduces the possibility of over-threshing, prevents cracks and splits in seed coats, and is suitable for all crops, and especially small grain crops, such as hard threshing wheat.

Because grooves 110 and corresponding vanes 111 are downstream directed grooves and vanes in that they are angled away from trailing rearward surface 100 of upstream face 82 at the upstream end of threshing fixture 71 toward downstream face 83 at the downstream end of threshing fixture 71, in response to movement of threshing bar 130 along the threshing direction of rotation of threshing drum 60 leading with leading edge 80 the crop cuttings and threshings are forced along the vanes 111 and into and through the grooves 110 defining the crop material conveyance pathways of the rasp structure of threshing fixture 71 of threshing bar 130 in a rearward direction from leading edge 80 to trailing end 81 and further in an angled direction from downstream side 83 of fixture 71 toward upstream side 82 of fixture 71 and are thrust outwardly therefrom toward upstream location 55A of threshing drum 60 and away from upstream face 82. This thrusting of crop cuttings and threshings toward upstream location 55A of threshing drum slows the conveyance of this material along thresher 55 from upstream location 55A to downstream location 55B thereby prolonging the applied threshing action to the crop cuttings to provided a thorough, repeated, more prolonged, and aggressive threshing of the crop cuttings to be threshed as thresher 55 rotates. Furthermore, as each threshing bar 130 is rotated along the threshing direction of rotation, it is to be emphasized that part of the crop cuttings to be threshed impacts the oncoming oblique crop material deflecting surface defined by forward surface 101 of upstream face 82, which deflects the crop cuttings outwardly therefrom toward upstream location 55A of threshing drum 60 and away from upstream face 82. This deflection of crop cuttings toward upstream location 55A of threshing drum 60 as deflected by forward surface 101 of upstream face 82 further slows the conveyance of this material along thresher 55 from upstream location 55A to downstream location 55B thereby prolonging the applied threshing action to the crop cuttings to provide a thorough, repeated, more prolonged, and aggressive threshing of the crop cuttings to be threshed as thresher 55 rotates as with threshing bar 70.

Figure 18:
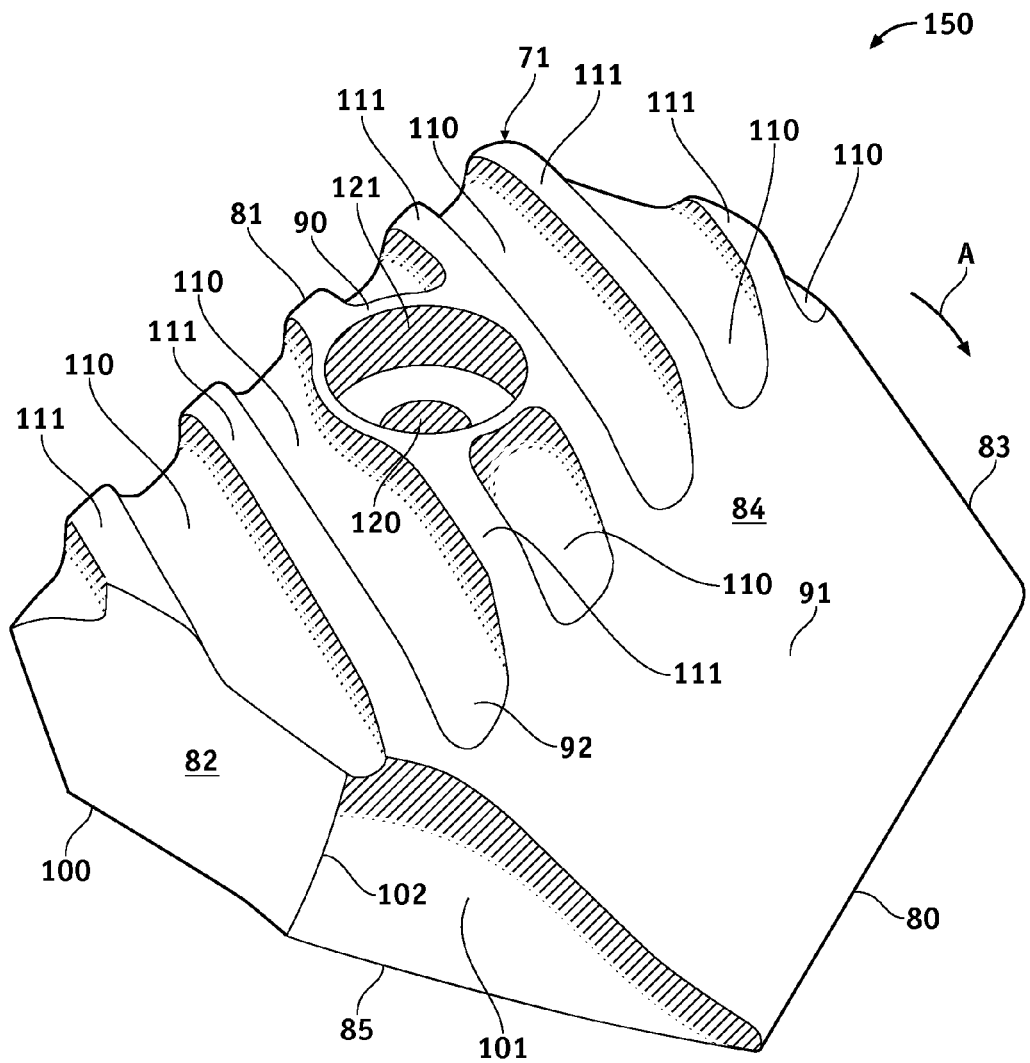
FIG. 18 is a front perspective view of a further embodiment of a threshing bar constructed and arranged in accordance with the principle of the invention.
Figure 19:
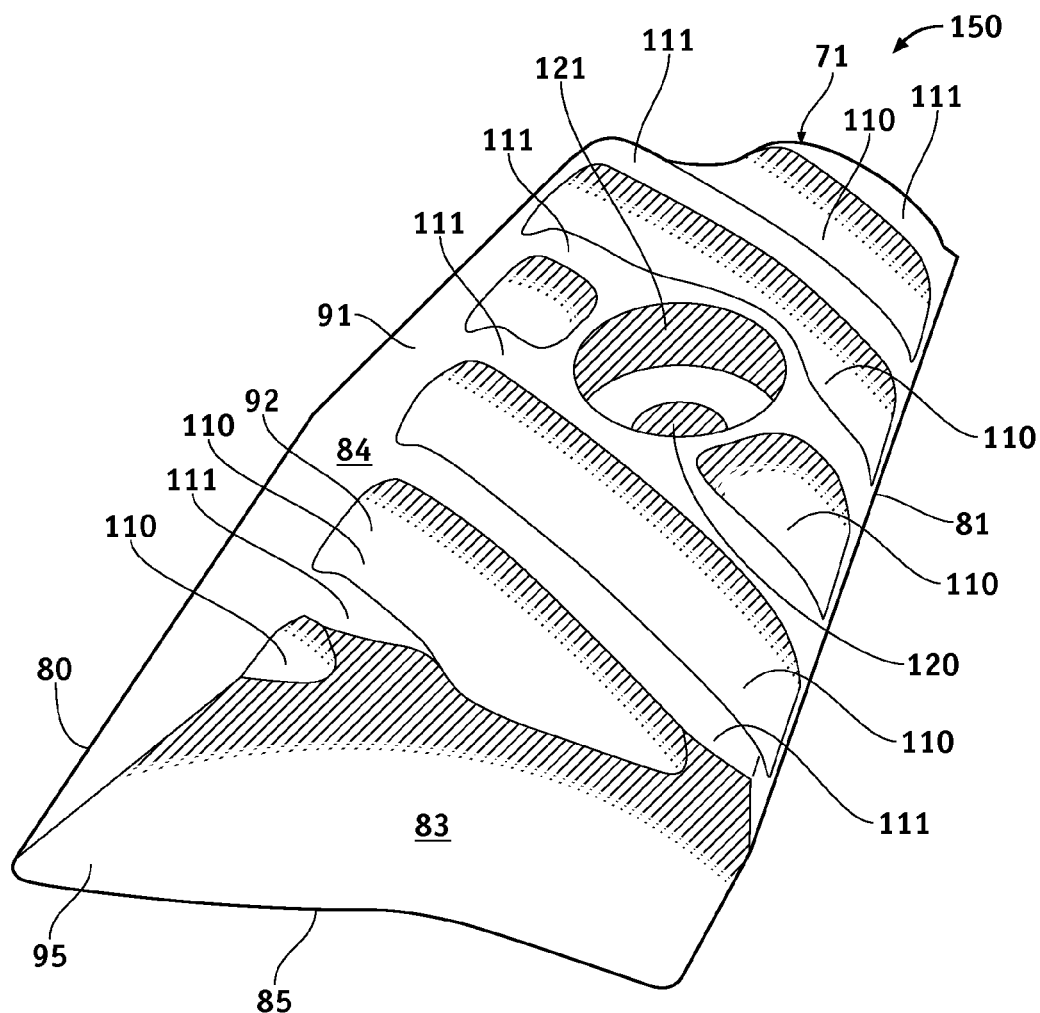
FIG. 19 is a rear perspective view of the embodiment of FIG. 18.
Figure 20:
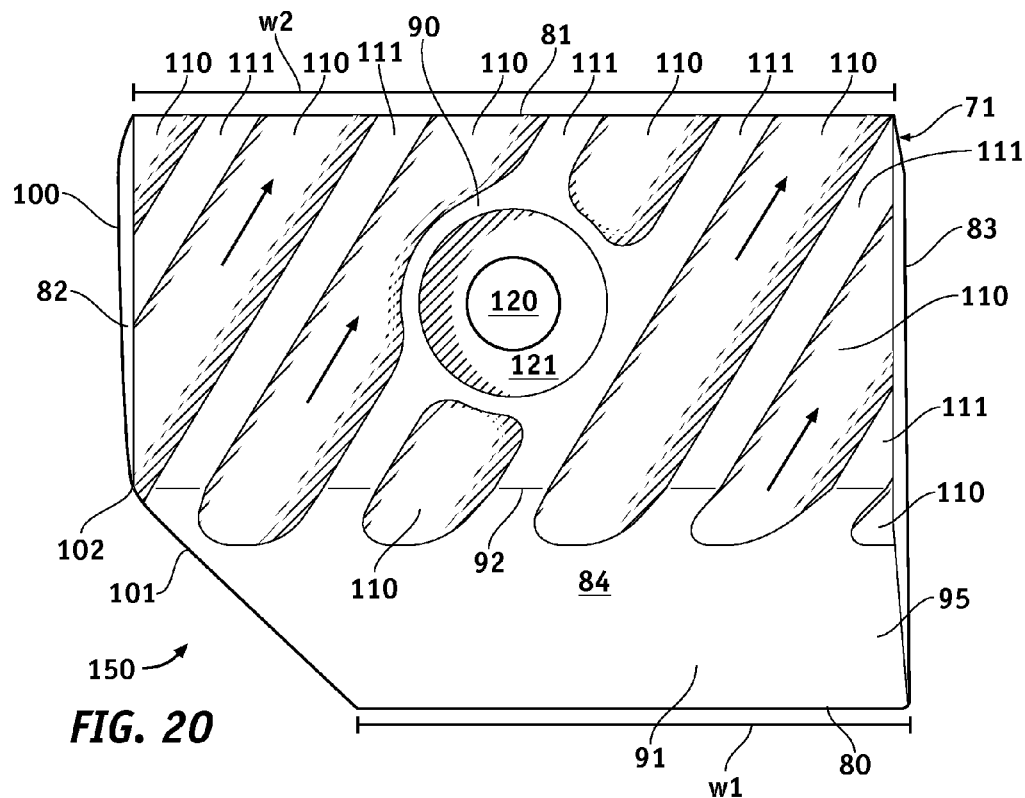
FIG. 20 is a top plan view of the embodiment of FIG. 18.
Figure 21:
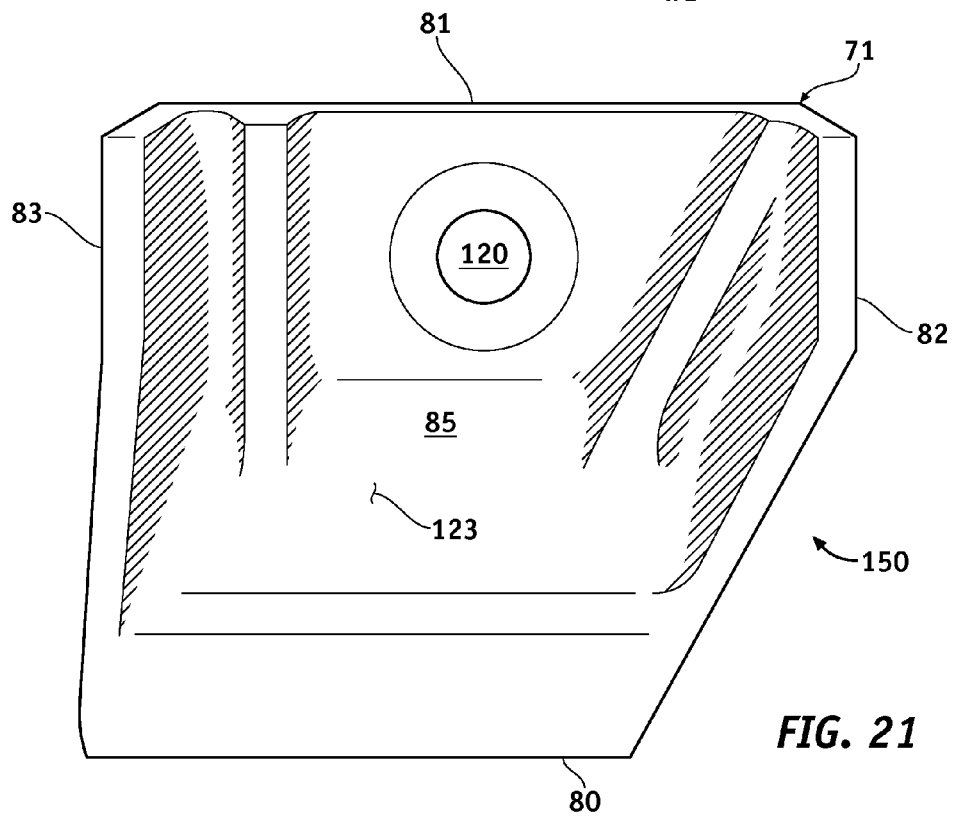
FIG. 21 is a bottom plan view of the embodiment of FIG. 18.
Figure 22:
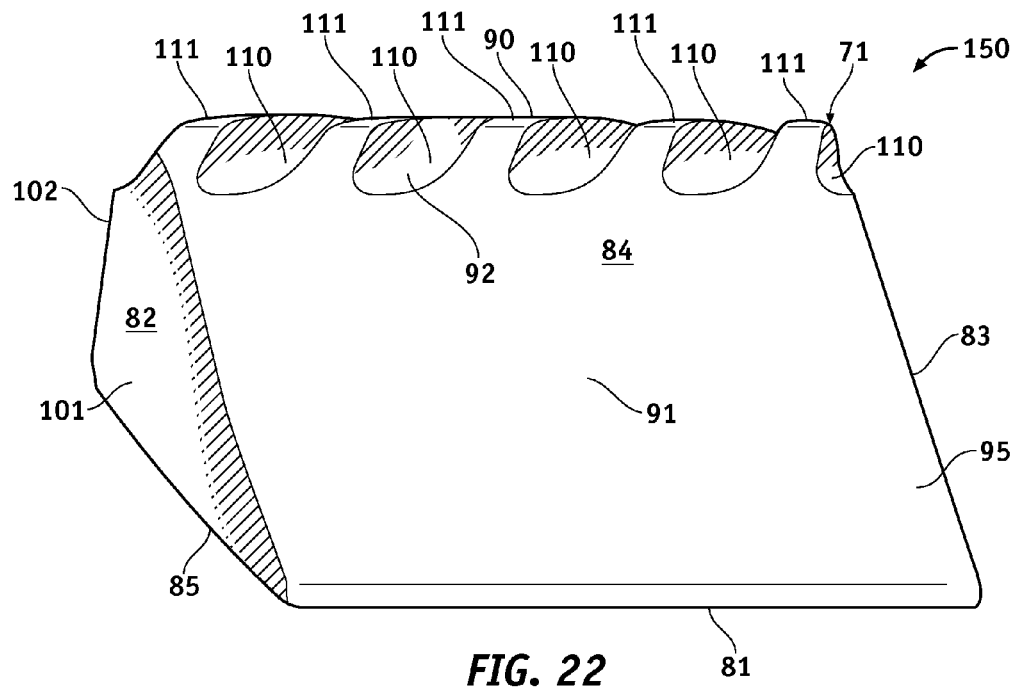
FIG. 22 is a front elevation view of the embodiment of FIG. 18.
Figure 23:
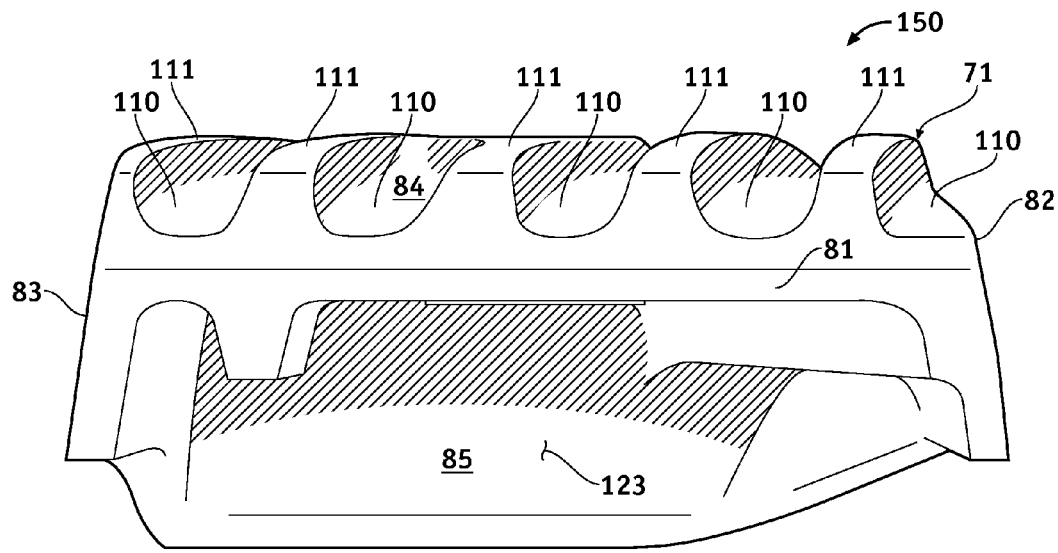
FIG. 23 is a rear elevation view of the embodiment of FIG. 18.
Figure 24:
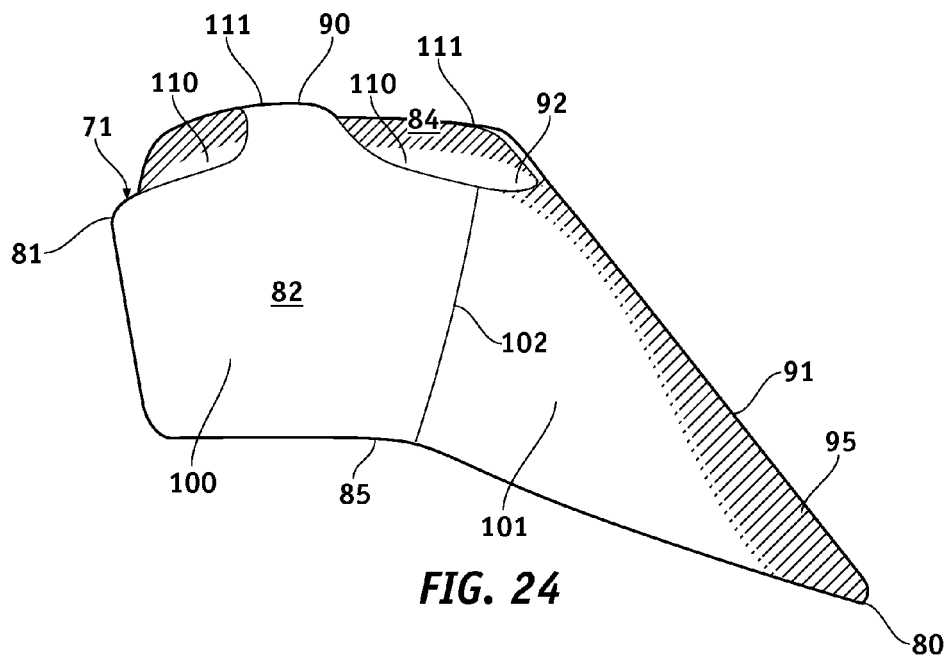
FIG. 24 is a left or upstream side elevation view of the embodiment of FIG. 18.
Figure 25:
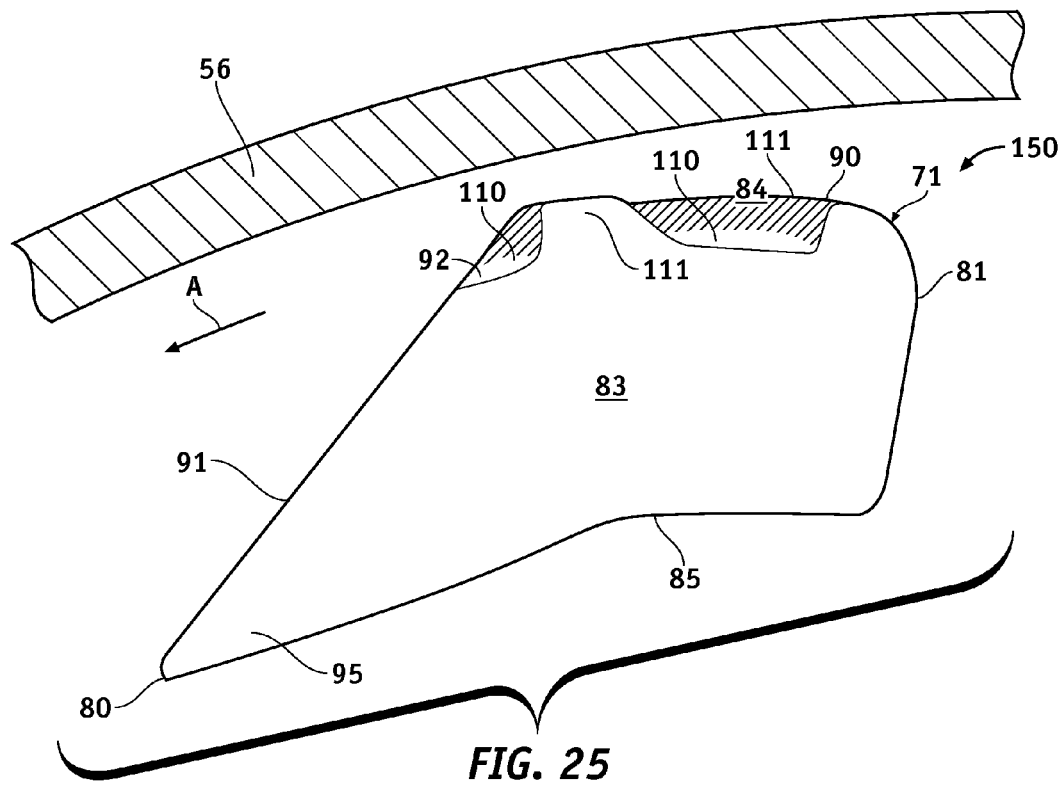
FIG. 25 is a right or downstream side elevation view of the embodiment of FIG. 18 shown as it would appear operatively positioned with respect to a section view of a thresher concave.

FIGS. 18-25 illustrate a third embodiment of a threshing bar 140 constructed and arranged in accordance with the principle of the invention. FIG. 18 is a front perspective view of threshing bar 140, a population of which in a particular embodiment is applied to cylindrical exterior 61 of threshing drum 60 being then part of thresher 55 forming an exemplary thresher embodiment of the invention. FIG. 19 is a rear perspective view of threshing bar 140, FIG. 20 is a top plan view of threshing bar 140, FIG. 21 is a bottom plan view of threshing bar 140, FIG. 22 is a front elevation view of threshing bar 140, FIG. 23 is a rear elevation view of threshing bar 140, FIG. 24 is a left or upstream side elevation view of threshing bar 140, and FIG. 25 is a right or downstream side elevation view of threshing bar 140 shown as it would appear operatively positioned with respect to a section view of thresher concave 56.

Referencing FIGS. 18-25 in relevant part, threshing bar 140 is somewhat different from threshing bar 70 and threshing bar 130 in overall shape, but in structure is common to threshing bars 70 and 130 as threshing bar 140 shares fixture 71, including leading edge 80 having width W1, trailing end 81 having width W2 that is greater than width W1 of leading edge 80, upstream face 82, downstream face 83, top threshing side 84, bottom threshing drum emplacement side 85, trailing threshing face 90, leading threshing face 91, corner 92, wedge 95, rearward surface 100, forward surface 101, corner 102, grooves 110 and corresponding vanes 111, bore 120 and corresponding counterbore 121 to accommodate a nut-and-bolt fastener for securing threshing bar 140 to cylindrical exterior 61 of threshing drum 60 referenced in connection with threshing bar 70 in FIG. 41, and cavity 123.

A rasp structure is formed in and along trailing threshing face 90 of top threshing side 84 of threshing fixture 71 of threshing bar 140. This rasp structure of threshing bar 140 consists of alternating crop threshing grooves 110 and vanes 111. Crop threshing grooves 110 are formed in top threshing side 84 of threshing fixture 71 of threshing bar 140, which form and are separated by corresponding upstanding vanes 111. Vanes 111 are elongate and have an equal and generally uniform height and width relative to each other, and grooves 110 are similarly elongate and correspond in length to the lengths of the corresponding vanes 111 and have a generally equal and uniform width and depth relative to each other. Grooves 110 and corresponding vanes 111 are formed in trailing threshing face 90 of top threshing side 84 of threshing fixture 71, and extend along threshing fixture 71 in a direction from trailing end 81 of threshing fixture 71 to leading edge 80 of threshing fixture 71, and extend from trailing end 81 of threshing fixture 71 to corner 92 formed in top threshing side 84 of threshing fixture 71.

Grooves 110 and corresponding vanes 111 are parallel relative to each other, and are still further oblique relative to the oblique crop material deflecting surface defined by forward surface 101 of upstream face 82 of threshing fixture 71, and are oblique relative to leading edge 80 of threshing fixture 71 and also, for reference purposes, downstream face 83 and rearward surface 100 of upstream face 82 of threshing fixture 71. As such, grooves 110 and corresponding vanes 111 are upstream directed grooves and vanes in that they are angled away from downstream face 83 at the downstream end of threshing fixture 71 toward rearward and forward surfaces 100 and 101 of upstream face 82 at the upstream end of threshing fixture 71. Grooves 110 and corresponding vanes 111 define crop material conveyance pathways that extend along or otherwise across top threshing side 84 of fixture 71 in the opposite direction along threshing fixture 71 being a direction from leading edge 80 to trailing end 81 and, more particularly, in an angled direction from upstream side 82 of fixture 71 toward downstream side 83 of fixture 71. Although grooves 110 and corresponding vanes 111 are oblique relative to the oblique crop material deflecting surface defined by forward surface 101 of upstream face 82 of threshing fixture 71, they are substantially perpendicular relative to the oblique crop material deflecting surface defined by forward surface 101 of upstream face 82 of threshing fixture 71, in which the term "substantially perpendicular" means perpendicular within a deviation range of from zero to approximately 20 degrees, whereby in the present embodiment there is a deviation of approximately ten degrees. And so within this range of deviation, grooves 110 and corresponding vanes 111 are substantially perpendicular relative to the oblique crop material deflecting surface defined by forward surface 101 of upstream face 82 of threshing fixture 71. In threshing bar 140 grooves 110 and corresponding vanes 111 extend to and terminate at leading threshing face 91 at corner 92, and do not further extend downwardly along leading threshing face 91 of top threshing side 84 of threshing fixture 71 from corner 92 leaving leading threshing face 91 bare and free of a rasp structure.

Figure 36:
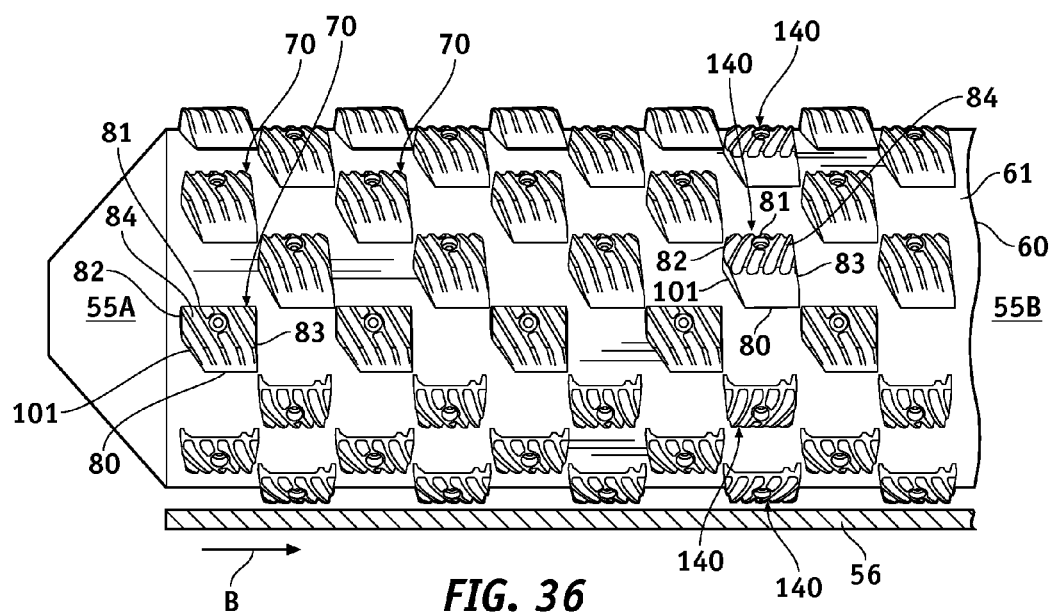

Threshing bar 140 is applied and secured to a cylindrical exterior of a threshing drum in the same way as threshing bar 70 previously discussed and which is shown in FIG. 25, whereby threshing side 84 of threshing bar 140 and the rasp structure formed therein faces outwardly toward and confronts thresher concave 56. A threshing drum may be formed with a population of threshing bars 140 applied in a regular or specified pattern across the cylindrical exterior as shown in FIG. 36. In FIG. 36 threshing bars 140 are shown set onto cylindrical exterior 61 of threshing drum 60 in preparation for threshing. Threshing bars 140 are positioned with their leading edges 80 and leading threshing faces 91 directed into the threshing direction of rotation of threshing drum 60 indicated by arrowed line A so to direct their upstream faces 82 toward the upstream location 55A of threshing drum, and so as to direct their downstream faces 83 toward the downstream location 55B of threshing drum 60. Because upstream faces 82 of threshing bars 140 are directed toward upstream location of threshing drum 60, the oblique crop material deflecting surface defined by forward surface 101 of upstream face 82 of each threshing bar 140 also faces upstream location 55A of threshing drum 60, and is oblique and angled toward upstream location 55A of threshing drum 60 relative to the threshing direction of rotation of threshing drum 60 as indicated by arrowed line A. In response to rotation of threshing drum 60 in the threshing direction of rotation denoted by arrowed line A threshing bars 140 lead with their leading edges 80 and trail with their trailing ends 81 and crop cuttings applied between cylindrical exterior 61 of threshing drum 60 and thresher concave 56 are threshed by and between top threshing sides 84 of threshing bars 140 and thresher concave 56 separating the grains from the chaff to form threshings, namely, the chaff and the separated grains. A conveyance (not shown) of combine harvester 50, such as an auger, conveys the threshings along the rotating thresher 55 in a direction indicated by arrowed line B from upstream location 55A of thresher 55 to downstream location 55B of thresher 55 where the grains fall through sieves 57 into collection tank 58 inside combine harvester 50 as shown in FIG. 1.

As each threshing bar 140 is rotated along the threshing direction of rotation A the crop cuttings to be threshed are received between top threshing face 84 of threshing bar 140 and thresher concave 56, in which the crop cuttings to be threshed are applied to and across and encounter top threshing face 84 from leading edge 80 to trailing end 81 and encounter and impact first leading threshing face 91 and then impact and encounter grooves 110 and corresponding vanes 111 applied along trailing threshing face 90 imparting a threshing action against the crop cuttings to be threshed to separate the chaff and the grain of the crop cuttings to form threshings. The application of grooves 110 and corresponding vanes 111 along just trailing threshing face 90 and with leading threshing face 91 of threshing bar 140 being bare and free of rasp structure causes threshing bar 140 to perform a less aggressive threshing of the crop cuttings to be threshed compared to the threshing action performed by threshing bar 70. And so the rasp structure formed by grooves 110 and corresponding vanes 111 of threshing bar 140 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 110 and corresponding vanes 111. The rasp structure of threshing fixture 71 of threshing bar 140 defined by grooves 110 and corresponding vanes 111 as herein described reduces the possibility of over-threshing, prevents cracks and splits in seed coats, and is suitable for all crops, and especially hard threshing crops.

Because grooves 110 and corresponding vanes 111 are upstream directed grooves and vanes in that they are angled away from downstream face 83 at the downstream end of threshing fixture 71 toward rearward and forward surfaces 100 and 101 of upstream face 82 at the upstream end of threshing fixture 71, in response to movement of threshing bar 140 along the threshing direction of rotation of threshing drum 60 leading with leading edge 80 the crop cuttings and threshings are forced along the crop material conveyance pathways defined by grooves 110 and corresponding vanes 111 extending in a forward direction from leading edge 80 to trailing end 81 and further in an angled direction from upstream side 82 of fixture 71 toward downstream side 82 of fixture 71 and are thrust outwardly therefrom toward downstream location 55B of threshing drum 60 and away from downstream face 83. This thrusting of crop cuttings and threshings toward downstream location 55A of threshing drum increases the rate of the conveyance of this material along thresher 55 from upstream location 55A to downstream location 55B thereby reducing the applied threshing action to the crop cuttings to provided a less aggressive and less thorough, and less repeated, and less prolonged, threshing of the crop cuttings to be threshed as thresher 55 rotates compared to the threshing action performed by threshing bar 70 and also threshing bar 130. Furthermore, as each threshing bar 130 is rotated along the threshing direction of rotation, it is to be emphasized that part of the crop cuttings to be threshed impacts the oncoming oblique crop material deflecting surface defined by forward surface 101 of upstream face 82, which deflects the crop cuttings outwardly therefrom toward upstream location 55A of threshing drum 60 and away from upstream face 82. This deflection of crop cuttings toward upstream location 55A of threshing drum 60 as deflected by forward surface 101 of upstream face 82 further slows the conveyance of this material along thresher 55 from upstream location 55A to downstream location 55B thereby providing some repeated threshing of the crop cuttings.

Figure 26:
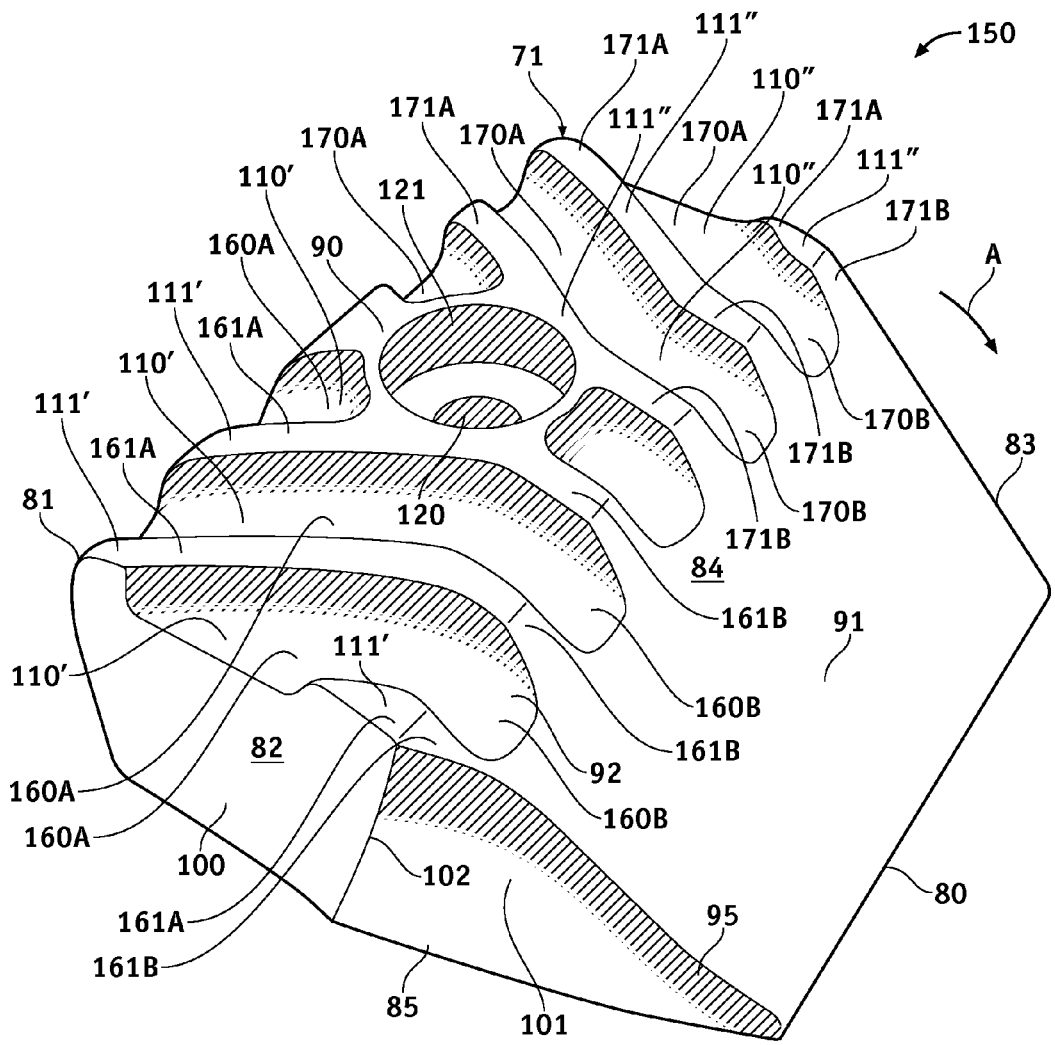
FIG. 26 is a front perspective view of yet still a further embodiment of a threshing bar constructed and arranged in accordance with the principle of the invention.
Figure 27:
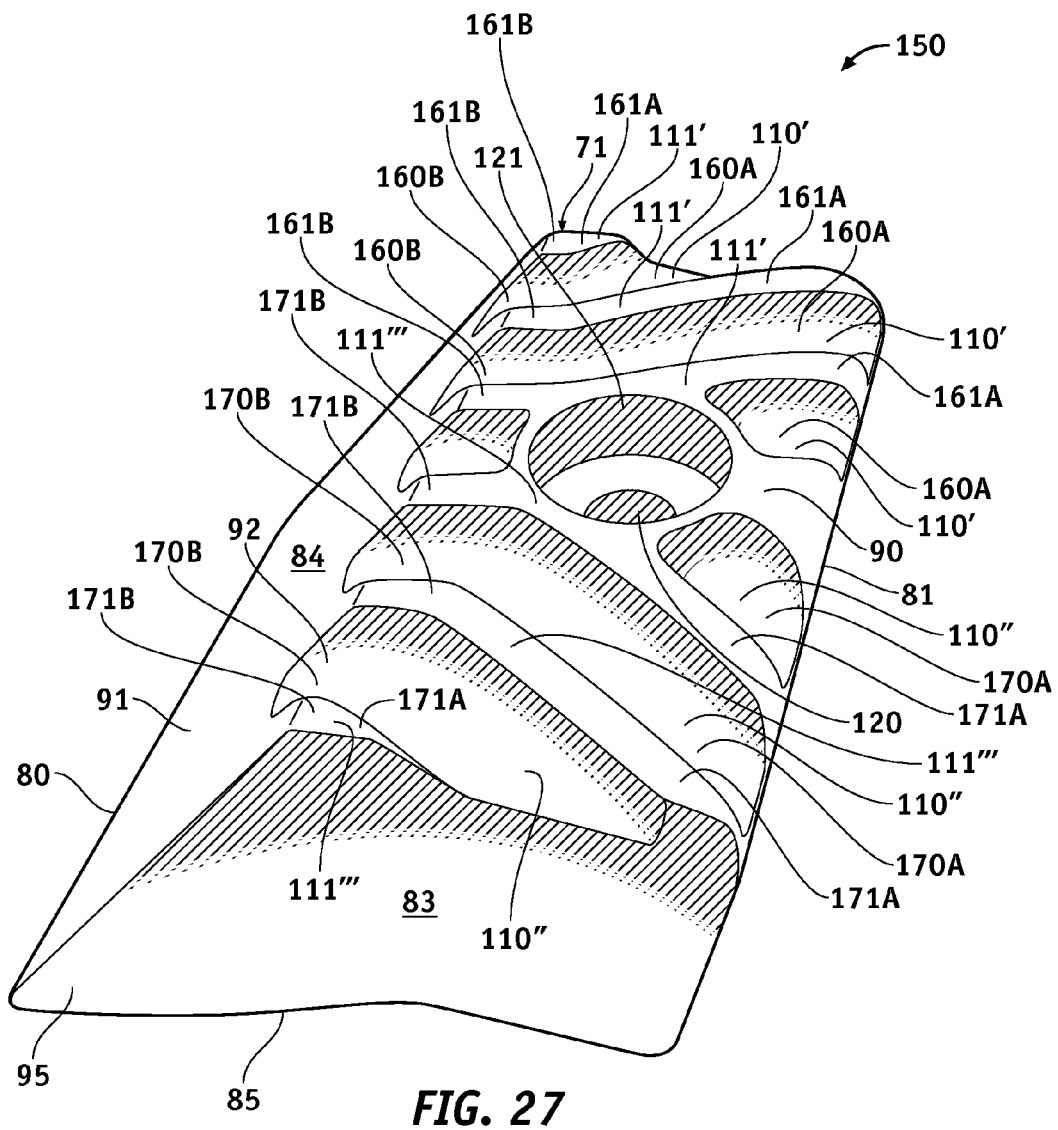
FIG. 27 is a rear perspective view of the embodiment of FIG. 26.
Figure 28:
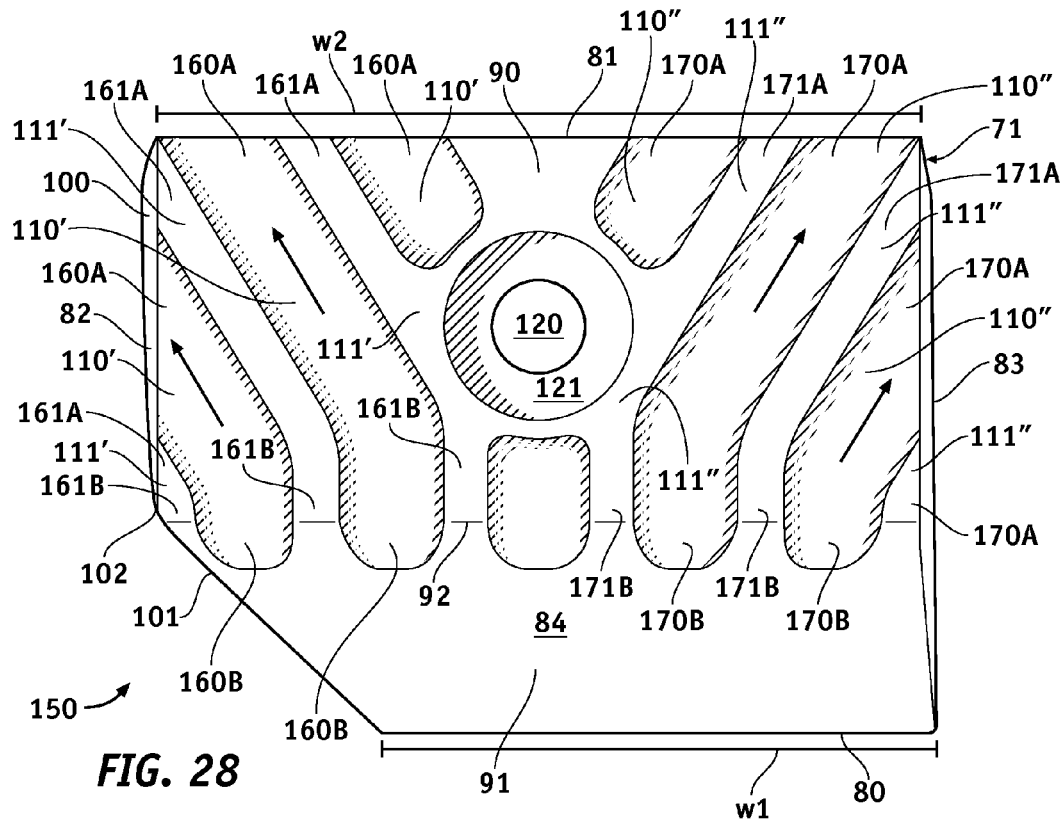
FIG. 28 is a top plan view of the embodiment of FIG. 26.
Figure 29:
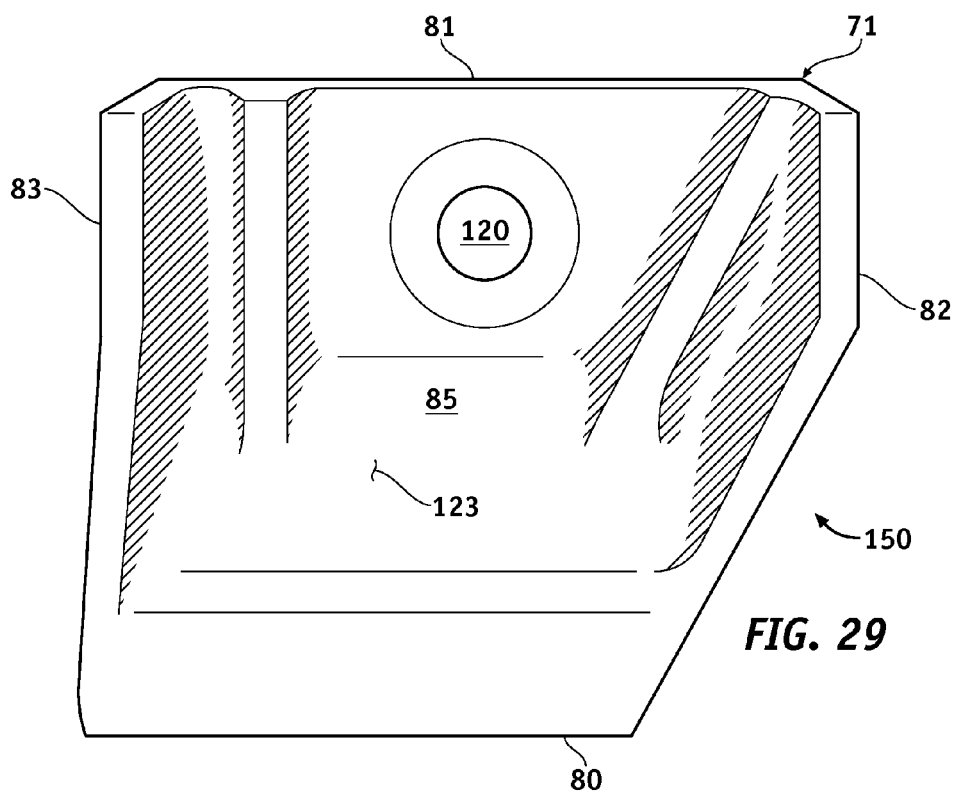
FIG. 29 is a bottom plan view of the embodiment of FIG. 26.
Figure 30:
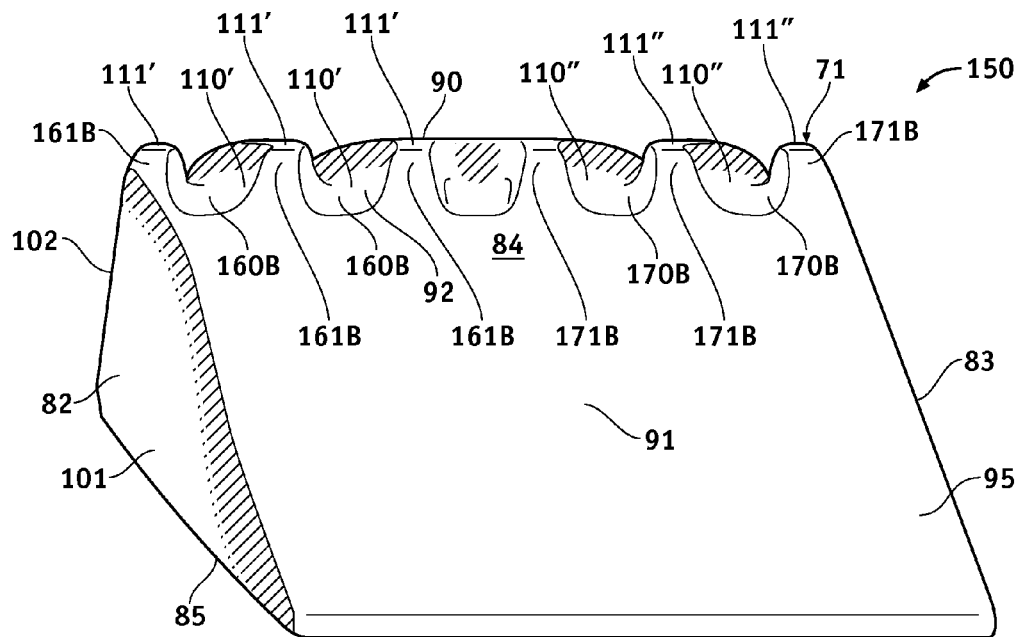
FIG. 30 is a front elevation view of the embodiment of FIG. 26.
Figure 31:
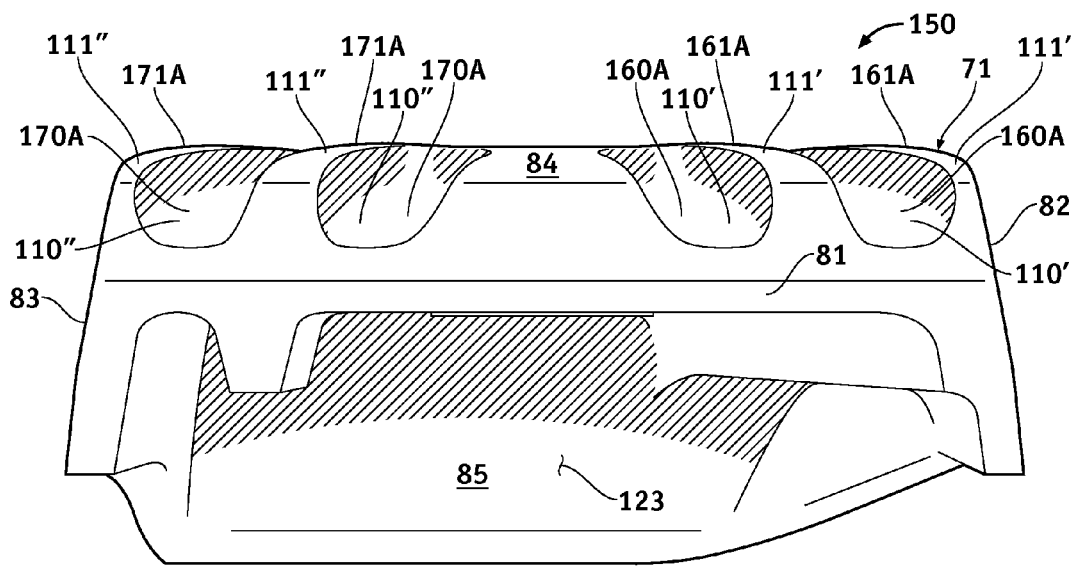
FIG. 31 is a rear elevation view of the embodiment of FIG. 26.
Figure 32:
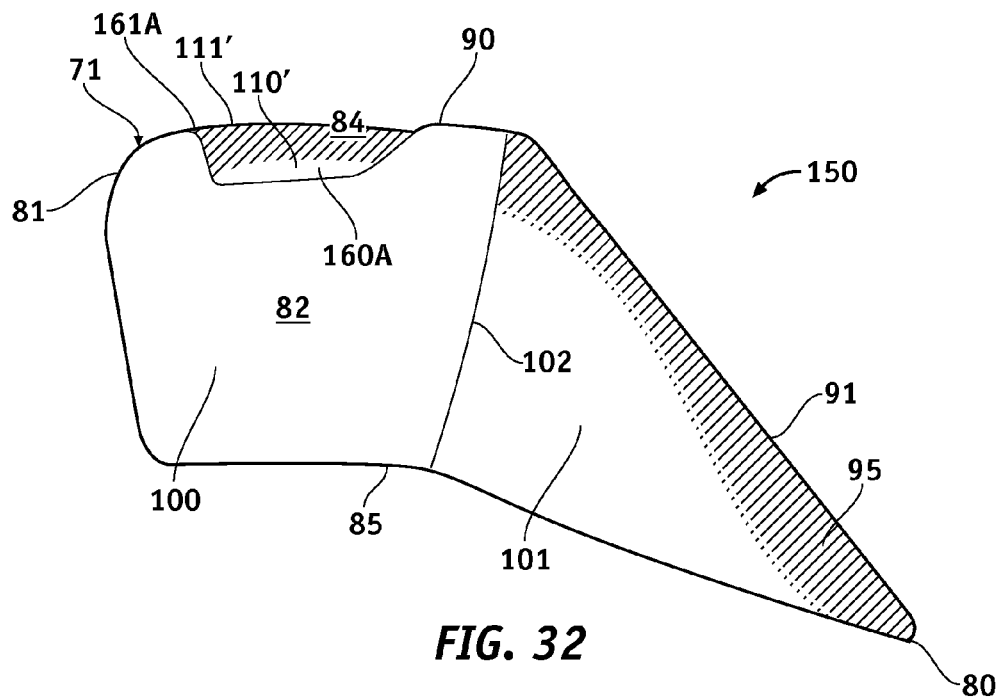
FIG. 32 is a left or upstream side elevation view of the embodiment of FIG. 26.
Figure 33:
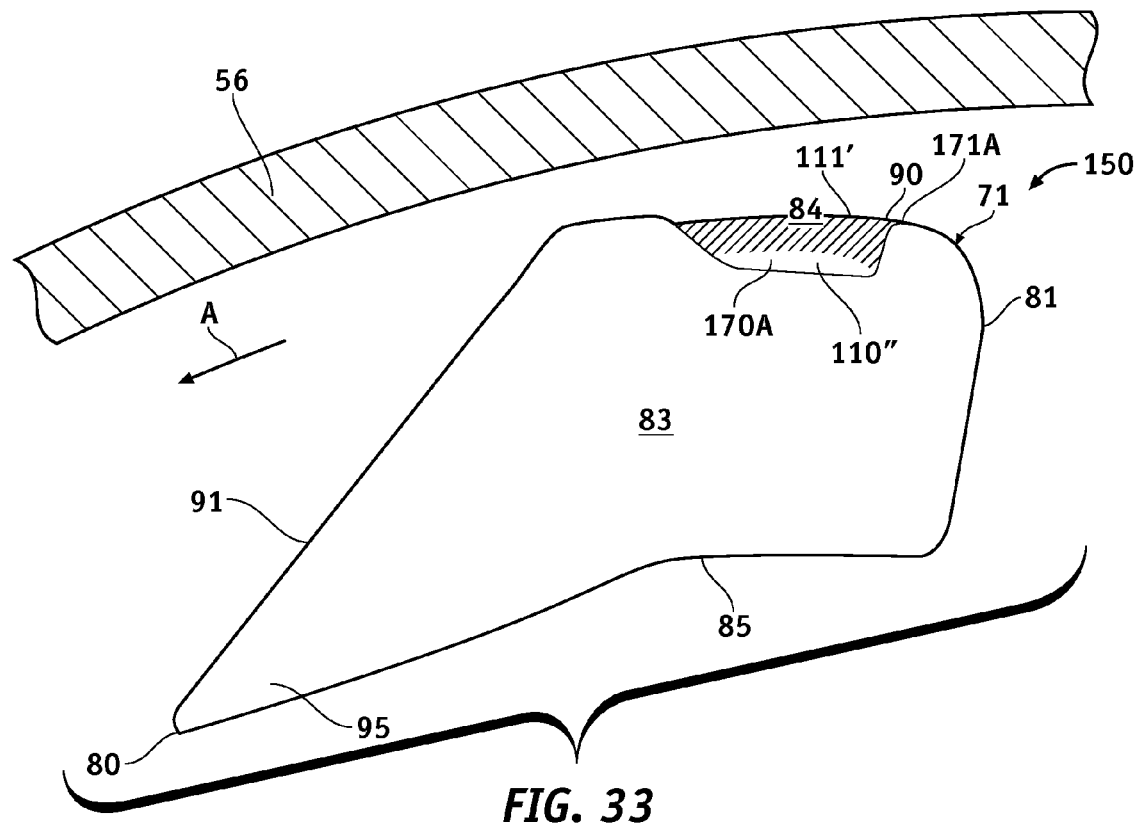
FIG. 33 is a right or downstream side elevation view of the embodiment of FIG. 26 shown as it would appear operatively positioned with respect to a section view of a thresher concave.

FIGS. 26-33 illustrate a fourth embodiment of a threshing bar 150 constructed and arranged in accordance with the principle of the invention. FIG. 26 is a front perspective view of threshing bar 150, a population of which in a particular embodiment is applied to cylindrical exterior 61 of threshing drum 60 being then part of thresher 55 forming an exemplary thresher embodiment of the invention. FIG. 27 is a rear perspective view of threshing bar 150, FIG. 28 is a top plan view of threshing bar 150, FIG. 29 is a bottom plan view of threshing bar 150, FIG. 30 is a front elevation view of threshing bar 150, FIG. 31 is a rear elevation view of threshing bar 150, FIG. 32 is a left or upstream side elevation view of threshing bar 150, and FIG. 33 is a right or downstream side elevation view of threshing bar 150 shown as it would appear operatively positioned with respect to a section view of thresher concave 56.

Referencing FIGS. 26-33 in relevant part, threshing bar 150 is somewhat different from threshing bar 70 and threshing bar 130 and threshing bar 140 in overall shape, but in structure is common to threshing bars 70, 130, and 140 as threshing bar 150 shares fixture 71, including leading edge 80 having width W1, trailing end 81 having width W2 that is greater than width W1 of leading edge 80, upstream face 82, downstream face 83, top threshing side 84, bottom threshing drum emplacement side 85, trailing threshing face 90, leading threshing face 91, corner 92, wedge 95, rearward surface 100, forward surface 101, corner 102, grooves 110 and corresponding vanes 111, bore 120 and corresponding counterbore 121 to accommodate a nut-and-bolt fastener for securing threshing bar 150 to cylindrical exterior 61 of threshing drum 60 referenced in connection with threshing bar 70 in FIG. 41, and cavity 123.

A rasp structure is formed in and along trailing threshing face 90 of top threshing side 84 of threshing fixture 71 of threshing bar 150. This rasp structure of threshing bar 140 consists of alternating crop threshing grooves 110 and vanes 111. Crop threshing grooves 110 are formed in top threshing side 84 of threshing fixture 71 of threshing bar 130, which form and are separated by corresponding upstanding vanes 111. Vanes 111 are elongate and have an equal and generally uniform height and width relative to each other, and grooves 110 are similarly elongate and correspond in length to the lengths of the corresponding vanes 111 and have a generally equal and uniform width and depth relative to each other. Grooves 110 and corresponding vanes 111 are formed in trailing threshing face 90 of top threshing side 84 of threshing fixture 71, and extend along threshing fixture 71 in a direction from trailing end 81 of threshing fixture 71 to leading edge 80 of threshing fixture 71, and extend from trailing end 81 of threshing fixture 71 to corner 92 formed in top threshing side 84 of threshing fixture 71.

In threshing bar 150, grooves 110 and corresponding vanes 111 are formed in trailing threshing face 90 of top threshing side 84 of threshing fixture 71, and extend along threshing fixture 71 in a direction from trailing end 81 of threshing fixture 71 to leading edge 80 of threshing fixture 71, and extend from trailing end 81 of threshing fixture 71 to corner 92 formed in top threshing side 84 of threshing fixture 71. Unlike threshing bar 70 and like threshing bar 130 and threshing bar 140, grooves 110 and corresponding vanes 111 extend to and terminate at leading threshing face 91 at corner 92, and do not further extend downwardly along leading threshing face 91 of top threshing side 84 of threshing fixture 71 from corner 92 leaving leading threshing face 91 bare and free of a rasp structure.

In threshing bar 150, grooves 110 and corresponding vanes 111 formed between upstream face 82 and bore 120 and corresponding counterbore 121 are denoted with a prime ("'") symbol, and grooves 110 and corresponding vanes 111 formed between downstream face 83 and bore 120 and corresponding counterbore 121 are denoted with a double prime ("''") symbol. Grooves 110' and corresponding vanes 111' are upstream grooves and vanes, and grooves 110'' and corresponding vanes 111' are opposing downstream grooves and vanes.

Grooves 110' and corresponding vanes 111' include rearward parallel groove portions 160A and corresponding rearward parallel vane portions 161A, and forward parallel groove portions 160B and corresponding forward parallel vane portions 161B. Groove portions 160A and corresponding parallel vane portions 161A extend from trailing end 81 of threshing fixture 71 to an intermediate position between trailing end 81 and corner 92, and forward parallel groove portions 160B and corresponding vane portions 161B extend therefrom to leading threshing face 91 at corner 92.

Grooves 110'' and corresponding vanes 111'' include rearward parallel groove portions 170A and corresponding rearward parallel vane portions 171A, and forward parallel groove portions 170B and corresponding forward parallel vane portions 171B. Groove portions 170A and corresponding parallel vane portions 171A extend from trailing end 81 of threshing fixture 71 to an intermediate position between trailing end 81 and corner 92, and forward parallel groove portions 170B and corresponding vane portions 171B extend therefrom to leading threshing face 91 at corner 92.

Groove portions 160A and corresponding vane portions 161A are parallel relative to each other, and are still further substantially parallel relative to the oblique crop material deflecting surface defined by forward surface 101 of upstream face 82 of threshing fixture 71, and are oblique relative to leading edge 80 of threshing fixture 71 and also, for reference purposes, rearward surface 100 of upstream face 82 of threshing fixture 71. As such, groove portions 160A and corresponding vane portions 161A are downstream directed grooves and vanes in that they are angled away from trailing rearward surface 100 of upstream face 82 at the upstream end of threshing fixture 71 toward downstream face 83 at the downstream end of threshing fixture 71. Groove portions 160A and corresponding vane portions 161A define crop material conveyance pathways that extend along or otherwise across top threshing side 84 of fixture 71 in the opposite direction along threshing fixture 71 being a direction from leading edge 80 to trailing end 81 and, more particularly, in an angled direction from downstream side 83 of fixture 71 toward upstream side 82 of fixture 71. Groove portions 160A and corresponding vane portions 161A are substantially parallel relative to the oblique crop material deflecting surface defined by forward surface 101 of upstream face 82 of threshing fixture 71, in which the term "substantially parallel" as explained in connection with threshing bar 70 means parallel within a deviation range of from zero to approximately 6 degrees, whereby in the present embodiment there is a deviation of approximately four degrees. And so within this range of deviation, groove portions 160A and corresponding vane portions 161A are substantially parallel relative to the oblique crop material deflecting surface defined by forward surface 101 of upstream face 82 of threshing fixture 71. Groove portions 160B and corresponding vane portions 161B are inclined otherwise angled relative to groove portions 160A and corresponding groove portions 161 such that they are oblique relative to the oblique crop material deflecting surface defined by forward surface 101 of upstream face 82, perpendicular relative to leading edge 80 and also trailing end 81, and such that they are further parallel with respect to downstream face 83 and rearward surface 100 of upstream face 82.

Groove portions 170A and corresponding vane portions 171A are parallel relative to each other, and are still further oblique relative to the oblique crop material deflecting surface defined by forward surface 101 of upstream face 82 of threshing fixture 71, and are oblique relative to leading edge 80 of threshing fixture 71 and also, for reference purposes, downstream face 83 and rearward surface 100 of upstream face 82 of threshing fixture 71. As such, groove portions 170A and corresponding vane portions 171A are upstream directed grooves and vanes in that they are angled away from downstream face 83 at the downstream end of threshing fixture 71 toward rearward and forward surfaces 100 and 101 of upstream face 82 at the upstream end of threshing fixture 71. Groove portions 170A and corresponding vane portions 171A define crop material conveyance pathways that extend along or otherwise across top threshing side 84 of fixture 71 in the opposite direction along threshing fixture 71 being a direction from leading edge 80 to trailing end 81 and, more particularly, in an angled direction from upstream side 82 of fixture 71 toward downstream side 83 of fixture 71. Although groove portions 170A and corresponding vane portions 171A are oblique relative to the oblique crop material deflecting surface defined by forward surface 101 of upstream face 82 of threshing fixture 71, they are substantially perpendicular relative to the oblique crop material deflecting surface defined by forward surface 101 of upstream face 82 of threshing fixture 71, in which the term "substantially perpendicular" means perpendicular within a deviation range of from zero to approximately 20 degrees, whereby in the present embodiment there is a deviation of approximately ten degrees. And so within this range of deviation, groove portions 170A and corresponding vane portions 171A are substantially perpendicular relative to the oblique crop material deflecting surface defined by forward surface 101 of upstream face 82 of threshing fixture 71. Groove portions 170B and corresponding vane portions 171B are inclined otherwise angled relative to groove portions 170A and corresponding groove portions 171 such that they are oblique relative to the oblique crop material deflecting surface defined by forward surface 101 of upstream face 82, perpendicular relative to leading edge 80 and also trailing end 81, and such that they are further parallel with respect to downstream face 83 and rearward surface 100 of upstream face 82, and are still further parallel with respect to groove portions 160B and corresponding vane portions 161B.

Groove portions 160A and corresponding vane portions 161A of grooves 110' and corresponding vanes 111', and groove portions 170A and corresponding vane portions 171A of grooves 110" and corresponding vanes 111" converge inwardly toward each other in a direction from trailing end 81 to leading edge 80 at the geometric center of threshing fixture 71 to the respective groove portions 160B and 170B and vane portions 161B and 171B, which are parallel relative to each other, and also diverge away from one another in the opposite direction from leading edge 80 to trailing end 81.

Figure 37:
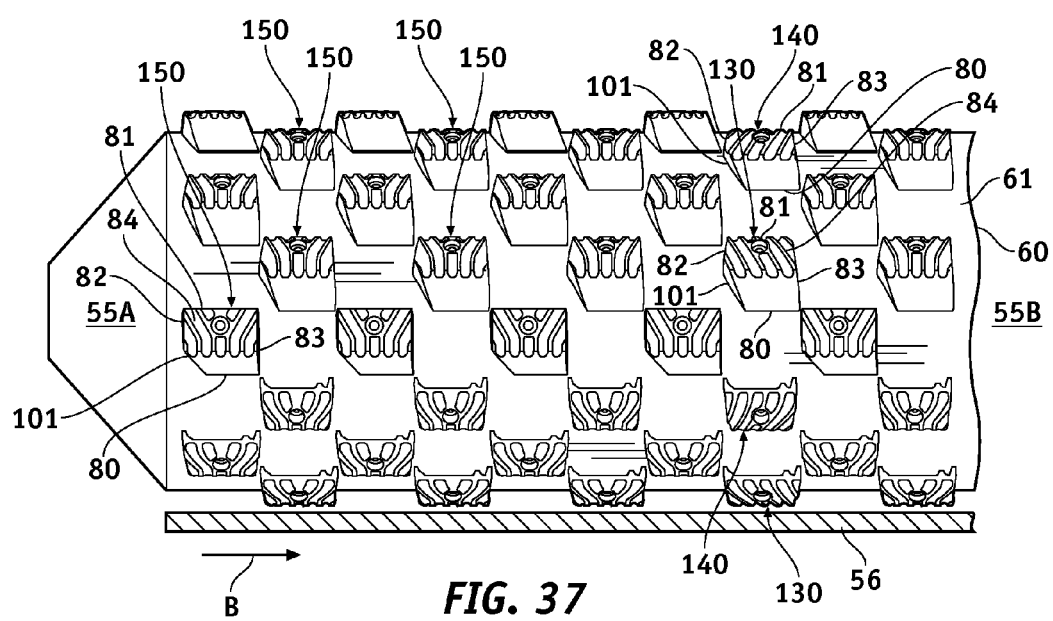

Threshing bar 150 is applied and secured to a cylindrical exterior of a threshing drum and positioned in the same way as threshing bar 70 previously discussed and which is shown in FIG. 33, whereby threshing side 84 of threshing bar 150 and the rasp structure formed therein faces outwardly toward and confronts thresher concave 56. A threshing drum may be formed with a population of threshing bars 140 applied in regular or specified pattern across the cylindrical exterior. In FIG. 37 threshing bars 150 are shown set onto cylindrical exterior 61 of threshing drum 60 in preparation for threshing. Threshing bars 150 are positioned with their leading edges 80 and leading threshing faces 91 directed into the threshing direction of rotation of threshing drum 60 indicated by arrowed line A so to direct their upstream faces 82 toward the upstream location 55A of threshing drum, and so as to direct their downstream faces 83 toward the downstream location 55B of threshing drum 60. Because upstream faces 82 of threshing bars 150 are directed toward upstream location of threshing drum 60, the oblique crop material deflecting surface defined by forward surface 101 of upstream face 82 of each threshing bar 150 also faces upstream location 55A of threshing drum 60, and is oblique and angled toward upstream location 55A of threshing drum 60 relative to the threshing direction of rotation of threshing drum 60 as indicated by arrowed line A. In response to rotation of threshing drum 60 in the threshing direction of rotation denoted by arrowed line A threshing bars 150 lead with their leading edges 80 and trail with their trailing ends 81 and crop cuttings applied between cylindrical exterior 61 of threshing drum 60 and thresher concave 56 are threshed by and between top threshing sides 84 of threshing bars 150 and thresher concave 56 separating the grains from the chaff to form threshings, namely, the chaff and the separated grains. A conveyance (not shown) of combine harvester 50, such as an auger, conveys the threshings along the rotating thresher 55 in a direction indicated by arrowed line B from upstream location 55A of thresher 55 to downstream location 55B of thresher 55 where the grains fall through sieves 57 into collection tank 58 inside combine harvester 50 as shown in FIG. 1.

As each threshing bar 150 is rotated along the threshing direction of rotation A the crop cuttings to be threshed are received between top threshing face 84 of threshing bar 130 and thresher concave 56, in which the crop cuttings to be threshed are applied to and across and encounter top threshing face 84 from leading edge 80 to trailing end 81 and encounter and impact first leading threshing face 91 and then impact and encounter grooves 110' and 110" and corresponding vanes 111' and 111" applied along trailing threshing face 90 imparting a threshing action against the crop cuttings to be threshed to separate the chaff from the grain of the crop cuttings to form threshings. The application of grooves 110' and 110" and corresponding vanes 111' and 111" along just trailing threshing face 90 and with leading threshing face 91 of threshing bar 150 being bare and free of rasp structure causes threshing bar 150 to perform a less aggressive threshing of the crop cuttings to be threshed compared to the threshing action performed by threshing bar 70. And so the rasp structure formed by 110' and 110" and corresponding vanes 111' and 111" of threshing bar 150 creates contact of the crop cuttings against the concave allowing more crop cuttings to rub together, and the rasp structure is aggressive and yet gentle on the crop cuttings to allow the crop cuttings to be managed through and along the crop material conveyance pathways formed by 110' and 110" and corresponding vanes 111' and 111". The rasp structure of threshing fixture 71 of threshing bar 150 defined by 110' and 110" and corresponding vanes 111' and 111" as herein described reduces the possibility of over-threshing, prevents cracks and splits in seed coats, and is suitable for all crops, and especially small grain crops, such as hard threshing wheat.

Because groove portions 160A and corresponding vane portions 161A are downstream directed grooves and vanes in that they are angled away from trailing rearward surface 100 of upstream face 82 at the upstream end of threshing fixture 71 toward downstream face 83 at the downstream end of threshing fixture 71, in response to movement of threshing bar 150 along the threshing direction of rotation of threshing drum 60 leading with leading edge 80 the crop cuttings and threshings are forced along the crop material conveyance pathways defined by groove portions 160A and corresponding vane portions 161A extending in a rearward direction from leading edge 80 to trailing end 81 and further in an angled direction from downstream side 83 of fixture 71 toward upstream side 82 of fixture 71 and are thrust outwardly therefrom toward upstream location 55A of threshing drum 60 and away from upstream face 82. This thrusting of crop cuttings and threshings toward upstream location 55A of threshing drum slows the conveyance of this material along thresher 55 from upstream location 55A to downstream location 55B thereby prolonging the applied threshing action to the crop cuttings to provided a thorough, repeated, more prolonged, and aggressive threshing of the crop cuttings to be threshed as thresher 55 rotates.

Because groove portions 170A and corresponding vane portions 171A directed toward the downstream side of threshing bar 150 opposing groove portions 160A and corresponding vane portions 170A directed toward the upstream side of threshing bar 150 are upstream directed grooves and vanes in that they are angled away from downstream face 83 at the downstream end of threshing fixture 71 toward rearward and forward surfaces 100 and 101 of upstream face 82 at the upstream end of threshing fixture 71, in response to movement of threshing bar 150 along the threshing direction of rotation of threshing drum 60 leading with leading edge 80 the crop cuttings and threshings are forced along the crop material conveyance pathways defined by groove portions 170A and corresponding vane portions 171A extending in a forward direction from leading edge 80 to trailing end 81 and further in an angled direction from upstream side 82 of fixture 71 toward downstream side 82 of fixture 71 and are thrust outwardly therefrom toward downstream location 55B of threshing drum 60 and away from downstream face 83. This thrusting of crop cuttings and threshings toward downstream location 55A of threshing drum increases the rate of the conveyance of this material along thresher 55 from upstream location 55A to downstream location 55B thereby reducing the applied threshing action to the crop cuttings to provided a less aggressive and less thorough, and less repeated, and less prolonged, threshing of the crop cuttings to be threshed as thresher 55 rotates compared to the threshing action performed by threshing bar 70 and also threshing bar 130.

Furthermore, as each threshing bar 150 is rotated along the threshing direction of rotation, it is to be emphasized that part of the crop cuttings to be threshed impacts the oncoming oblique crop material deflecting surface defined by forward surface 101 of upstream face 82, which deflects the crop cuttings outwardly therefrom toward upstream location 55A of threshing drum 60 and away from upstream face 82. This deflection of crop cuttings toward upstream location 55A of threshing drum 60 as deflected by forward surface 101 of upstream face 82 further slows the conveyance of this material along thresher 55 from upstream location 55A to downstream location 55B thereby prolonging the applied threshing action to the crop cuttings to provide some repeated threshing of the crop cuttings.

Because grooves 110' and 110" and corresponding vanes 111' and 111" incorporate downstream directed groove portions 160A and corresponding vane portions 161A and also upstream directed groove portions 170A and 171A as disclosed, the crop cuttings and threshings are concurrently thrust toward upstream location 55A of thresher 55 by downstream directed groove portions 160A and corresponding groove portions 161A, and are thrust toward downstream location 55B of thresher 55 by upstream directed groove portions 170A and corresponding vane portions 171A, and this provides a less thorough and less repeated threshing of the crop cuttings to be threshed as thresher 55 rotates. This causes threshing bar 150 to perform an even lesser aggressive threshing action compared to not only threshing bar 70 but also threshing bar 130, but a greater or more aggressive threshing action compared to threshing bar 140.

Figure 38:
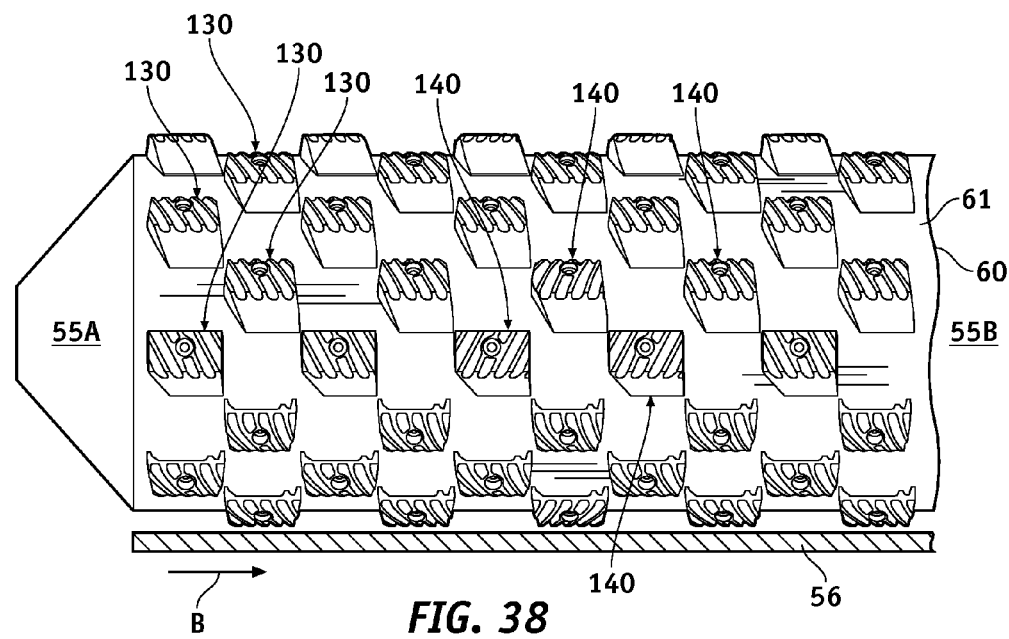
Figure 39:
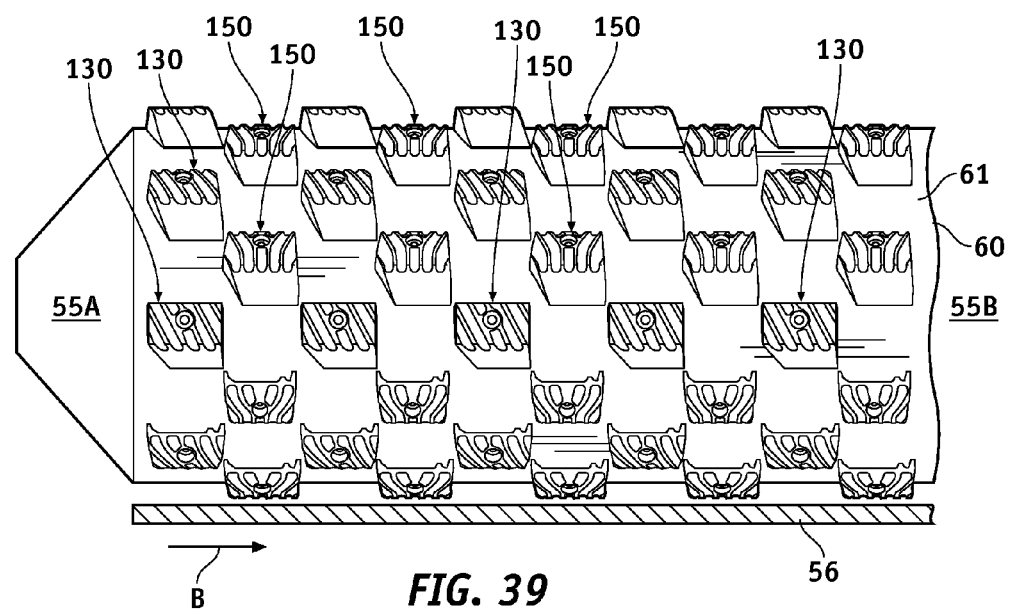

Threshing bars 70, 130, 140, and 150 perform different threshing functions, in that they have different threshing aggressiveness performance characteristics as described. Depending on the crop cuttings to be threshed, a threshing drum may be configured with varying combinations and patterns of threshing bars 70, 13, 140, and 150 to fine tune a threshing drum to meet a specific threshing action or characteristic in preparation to thresh a crop in need of such a fine tuned threshing drum. For instance, FIG. 34 illustrates threshing drum 55 formed with a pattern of threshing bars 70 and 150, FIG. 35 illustrates threshing drum 55 formed with a pattern of threshing bars 130 and 140, FIG. 36 illustrates threshing drum 55 formed with a pattern of threshing bars 70 and 140, FIG. 37 illustrates threshing drum 55 formed with a pattern of threshing bars 130, 140, and 150, FIG. 38 illustrates threshing drum 55 formed with a pattern of threshing bars 130 and 140, and FIG. 39 illustrates threshing drum 55 formed with a pattern of threshing bars 130 and 150. Other patterns and arrangements of threshing bars selected from threshing bars 70, 130, 140 and 150 may be formed on cylindrical exterior 61 of threshing drum 60 to form fined tuned threshing drums to meet specific threshing needs or threshing aggressiveness to comply with specific crops.

The invention has been described above with reference to preferred embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A combine harvester threshing drum threshing bar, comprising:
    a threshing fixture includes a leading edge and an opposed trailing end, a first face and an opposed second face, a top threshing side, and an opposed bottom threshing drum emplacement side;
    the opposed first and second faces extend between the top threshing side and the opposed bottom threshing drum emplacement side of the threshing fixture from the leading edge of the threshing fixture to the trailing end of the threshing fixture;
    the top threshing side includes a trailing threshing face and a leading threshing face that intersect at a corner formed in the top threshing side, the corner located between the leading edge and the trailing end of the threshing fixture and extends from the first face to the second face;
    the trailing threshing face extends between the opposed first and second faces of the threshing fixture from the trailing end to the corner;
    the leading threshing face extends between the opposed first and second faces of the threshing fixture from the corner to the leading edge, and inclines downwardly relative to the trailing threshing face from the corner and meets, and cooperates with, the bottom threshing drum emplacement side and the opposed first and second faces of the threshing fixture at the leading edge to form a wedge in the threshing fixture;
    a crop-threshing rasp structure formed in the top threshing side of the threshing fixture;
    the crop-threshing rasp structure comprises alternating grooves and vanes that extend along the trailing threshing face to the corner formed in the top threshing side of the threshing fixture and that further extend downwardly from the corner along the leading threshing face toward the leading edge of the threshing fixture, and the vanes extend outwardly from the corner where the trailing and leading threshing faces intersect and the grooves extend inwardly to the corner where the trailing and leading threshing faces intersect.

2. A combine harvester threshing drum threshing bar, comprising:
    a threshing fixture includes a leading edge and an opposed trailing end, a first face and an opposed second face, a top threshing side, and an opposed bottom threshing drum emplacement side;

the opposed first and second faces extend between the top threshing side and the opposed bottom threshing drum emplacement side of the threshing fixture from the leading edge of the threshing fixture to the trailing end of the threshing fixture;

the top threshing side includes a trailing threshing face and a leading threshing face that intersect at a corner formed in the top threshing side, the corner located between the leading edge and the trailing end of the threshing fixture and extends from the first face to the second face;

the trailing threshing face extends between the opposed first and second faces of the threshing fixture from the trailing end to the corner;

the leading threshing face extends between the opposed first and second faces of the threshing fixture from the corner to the leading edge, and inclines downwardly relative to the trailing threshing face from the corner and meets, and cooperates with, the bottom threshing drum emplacement side and the opposed first and second faces of the threshing fixture at the leading edge to form a wedge in the threshing fixture;

a crop-threshing rasp structure formed in the top threshing side of the threshing fixture, the crop-threshing rasp structure extends downwardly from the corner along the leading threshing face toward the leading edge of the threshing fixture, and the crop-threshing rasp structure extends inwardly to the corner where the trailing and leading threshing faces intersect and inwardly to the leading threshing face between the corner and the leading edge of the threshing fixture.

3. A combine harvester threshing drum threshing bar according to claim 2, further comprising the crop-threshing rasp structure extends along the trailing threshing face to the corner.

4. A combine harvester threshing drum threshing bar, comprising:

a threshing fixture includes a leading edge and an opposed trailing end, a first face and an opposed second face, a top threshing side, and an opposed bottom threshing drum emplacement side;

the opposed first and second faces extend between the top threshing side and the opposed bottom threshing drum emplacement side of the threshing fixture from the leading edge of the threshing fixture to the trailing end of the threshing fixture;

the top threshing side includes a trailing threshing face and a leading threshing face that intersect at a corner formed in the top threshing side, the corner located between the leading edge and the trailing end of the threshing fixture and extends from the first face to the second face;

the trailing threshing face extends between the opposed first and second faces of the threshing fixture from the trailing end to the corner;

the leading threshing face extends between the opposed first and second faces of the threshing fixture from the corner to the leading edge, and inclines downwardly relative to the trailing threshing face from the corner and meets, and cooperates with, the bottom threshing drum emplacement side and the opposed first and second faces of the threshing fixture at the leading edge to form a wedge in the threshing fixture;

a crop-threshing rasp structure formed in the top threshing side of the threshing fixture, the crop-threshing rasp structure extends downwardly from the corner along the leading threshing face toward the leading edge of the threshing fixture, the crop-threshing rasp structure that extends downwardly from the corner along the leading threshing face toward the leading edge of the threshing fixture comprises alternating grooves and vanes, the vanes extend outwardly from the corner where the trailing and leading threshing faces intersect and from the leading threshing face between the corner and the leading edge of the threshing fixture, and the grooves extend inwardly to the corner where the trailing and leading threshing faces intersect and to the leading threshing face between the corner and the leading edge of the threshing fixture.

5. A combine harvester threshing drum threshing bar according to claim 4, further comprising the crop-threshing rasp structure extends along the trailing threshing face to the corner.

\* \* \* \* \*